United States Patent
Ito et al.

(10) Patent No.: US 11,807,579 B2
(45) Date of Patent: Nov. 7, 2023

(54) ZIRCONIA SINTERED BODY AND MANUFACTURING METHOD OF THE SAME

(71) Applicant: TOSOH CORPORATION, Yamaguchi (JP)

(72) Inventors: Takeshi Ito, Kanagawa (JP); Yuji Matsumura, Kanagawa (JP); Isao Yamashita, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 328 days.

(21) Appl. No.: 17/010,486

(22) Filed: Sep. 2, 2020

(65) Prior Publication Data

US 2021/0061717 A1   Mar. 4, 2021

(30) Foreign Application Priority Data

Sep. 4, 2019 (JP) ................. 2019-161077
Sep. 4, 2019 (JP) ................. 2019-161082
Sep. 4, 2019 (JP) ................. 2019-161090

(51) Int. Cl.
  C04B 35/49   (2006.01)
  C04B 41/87   (2006.01)
  C04B 37/00   (2006.01)
  C04B 35/645  (2006.01)

(52) U.S. Cl.
  CPC .......... *C04B 35/49* (2013.01); *C04B 35/6455* (2013.01); *C04B 37/005* (2013.01); *C04B 41/87* (2013.01); *C04B 2235/3225* (2013.01); *C04B 2235/9653* (2013.01); *C04B 2235/9661* (2013.01); *C04B 2237/348* (2013.01)

(58) Field of Classification Search
  CPC ... C04B 35/49; C04B 35/6455; C04B 37/005; C04B 41/87; C04B 2235/3225; C04B 2235/9653; C04B 2235/9661; C04B 2237/348
  See application file for complete search history.

(56) References Cited

FOREIGN PATENT DOCUMENTS

JP    2013-14471 A      1/2013
JP    2013014471 A  *   1/2013

OTHER PUBLICATIONS

JP-2013014471-A machine translation (Year: 2013).*

* cited by examiner

*Primary Examiner* — Karl E Group
*Assistant Examiner* — Cameron K Miller
(74) *Attorney, Agent, or Firm* — GREENBLUM & BERNSTEIN, P.L.C.

(57) ABSTRACT

A zirconia sintered body that includes a transparent zirconia portion and an opaque zirconia portion has a biaxial bending strength of 300 MPa or more. In addition, the opaque zirconia portion is configured by an opaque zirconia sintered body that is any one of a dark-colored zirconia sintered body, a medium-light-colored zirconia sintered body, and a light-colored zirconia sintered body.

18 Claims, 1 Drawing Sheet

ZIRCONIA SINTERED BODY AND MANUFACTURING METHOD OF THE SAME

CROSS-REFERENCE TO RELATED APPLICATIONS

The present application claims priority under 35 U.S.C. § 119 of Japanese Application Nos. 2019-161077, 2019-161082, and 2019-161090 filed on Sep. 4, 2019 the disclosure of which is expressly incorporated by reference herein in its entirety.

BACKGROUND OF THE INVENTION

1. Field of the Invention

The present disclosure relates to a zirconia sintered body and a manufacturing method of the same.

2. Description of Related Art

Ceramics are used in a wide variety of industrial components and applications due to their superior heat resistance, wear resistance, and corrosion resistance. Of the ceramics, applications for transparent ceramics have expanded due to their heightened aesthetic qualities and texture. For example, applying transparent ceramics to timepiece components, jewelry items, and components for electronic devices such as cellular telephones has been studied. Accompanying this expanded range of uses, ceramics components configured by a transparent ceramic and a ceramic exhibiting a different color tone than the transparent ceramic are sought as components having not only heightened aesthetic qualities but also heightened design characteristics.

On the other hand, ceramic is a material with a high degree of toughness and so is difficult to work into complex shapes. Therefore, conventionally, a ceramic component having a complex shape is manufactured by joining ceramic pieces to each other.

For example, a ceramic joined body is reported in which a colored zirconia sintered body and a transparent zirconia sintered body are joined by causing the colored zirconia sintered body to contract and physically fixing it to the transparent zirconia sintered body (Japanese Patent Laid-open Publication No. 2013-014471).

The ceramic joined body described in Japanese Patent Laid-open Publication No. 2013-014471 leverages differences in thermal shrinkage during heat treatment to manufacture a joined body, and sintered bodies are joined to each other by physical force. The joined body has a low degree of strength and its applications are limited.

SUMMARY OF THE INVENTION

The present disclosure provides at least one of a zirconia sintered body and a manufacturing method of the zirconia sintered body that can be used in a wider range of applications as compared to a conventional ceramic joined body that contains transparent zirconia.

The researchers of the present disclosure conducted a study in view of the circumstances noted above, and as a result discovered that a specific zirconia sintered body can resolve the above-noted issues.

In other words, the present invention is as described in the scope of the claims, and an overview of the present disclosure is given below.

A zirconia sintered body that includes a transparent zirconia portion and an opaque zirconia portion has a biaxial bending strength of 300 MPa or more. In addition, the opaque zirconia portion is configured by an opaque zirconia sintered body that is any one of a dark-colored zirconia sintered body, a medium-light-colored zirconia sintered body, and a light-colored zirconia sintered body.

In the zirconia sintered body described above, the transparent zirconia portion and the opaque zirconia portion occupy the same plane.

In the zirconia sintered body described above, a in-line transmittance of the transparent zirconia portion is 50% or more.

In the zirconia sintered body described above, the in-line transmittance of the opaque zirconia portion is less than 5%.

In the zirconia sintered body described above, $L^*$ in the $L^*a^*b^*$ color system for the opaque zirconia sintered body is 0 or more and 30 or less.

In the zirconia sintered body described above, $L^*$ in the $L^*a^*b^*$ color system for the opaque zirconia sintered body is more than 30 and 60 or less.

In the zirconia sintered body described above, $L^*$ in the $L^*a^*b^*$ color system for the opaque zirconia sintered body is more than 60.

In the zirconia sintered body described above, the transparent zirconia portion contains zirconia that contains a stabilizer and titania.

In the zirconia sintered body described above, the stabilizer is at least one selected from a group of yttria, calcia, and magnesia.

In the zirconia sintered body described above, the stabilizer in the transparent zirconia portion is yttria, and yttria content is 6 mol % or more and 12 mol % or less.

In the zirconia sintered body described above, the stabilizer in the opaque zirconia portion is yttria, and yttria content is 2 mol % or more and less than 6 mol %.

In the zirconia sintered body described above, the opaque zirconia portion contains a coloring element.

In the zirconia sintered body described above, the coloring element is at least one selected from a group of transition metal elements, alkali metal elements, alkaline earth metal elements, aluminum, silicon, boron, phosphorus, germanium, and rare earth elements.

In the zirconia sintered body described above, the biaxial bending strength is 350 MPa or more.

A manufacturing method of the zirconia sintered body described above includes a sintering process in which a primary green body, configured by one of a raw material powder for the transparent zirconia portion and a raw material powder for the opaque zirconia portion, and a green body configured by the other raw material powder are laminated to create a secondary green body, and the secondary green body is sintered.

In the manufacturing method of the zirconia sintered body described above, the raw material powder for the transparent zirconia portion is a mixed powder containing a stabilizer-containing zirconia source and a titania source.

In the manufacturing method of the zirconia sintered body described above, the sintering includes at least HIP treatment.

In the manufacturing method described above, the sintering is performed with atmospheric pressure sintering at 1300° C. or more and 1400° C. or less, after which HIP treatment is performed at 1450° C. or more and 1550° C. or less.

With the zirconia sintered body according to the present disclosure, at least one of a zirconia sintered body and a manufacturing method of the zirconia sintered body can be provided that can be used in a wider range of applications, as compared to a conventional ceramic joined body that contains transparent zirconia.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1A:
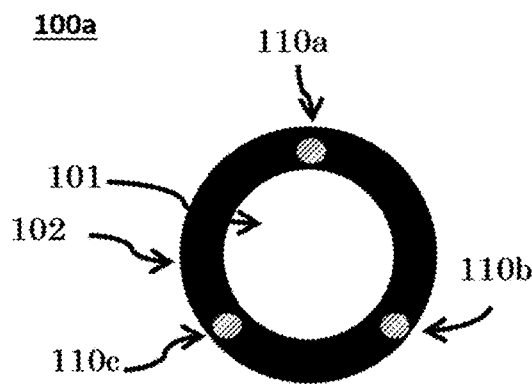
FIGS. 1A and 1B are schematic diagrams illustrating measurement of biaxial bending strength.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a zirconia sintered body according to the present disclosure is described by way of an exemplary embodiment.

The present embodiment is a zirconia sintered body that includes a transparent zirconia portion and an opaque zirconia portion, the zirconia sintered body having a biaxial bending strength of 300 MPa or more. The opaque zirconia portion is configured by an opaque zirconia sintered body that is any one of a dark-colored zirconia sintered body, a medium-light-colored zirconia sintered body, and a light-colored zirconia sintered body.

The zirconia sintered body according to the present embodiment includes the transparent zirconia portion and the opaque zirconia portion. Accordingly, aesthetics and design characteristics are readily heightened. In another embodiment, the zirconia sintered body according to the present embodiment is a zirconia sintered body that includes a multicolor zirconia sintered body (in other words, a zirconia sintered body with two or more different color tones). In yet another embodiment, the zirconia sintered body according to the present embodiment is a sintered body that includes a zirconia sintered body that transmits light and a zirconia sintered body that does not transmit light, and moreover is a zirconia sintered body configured by a zirconia sintered body that can be visually recognized as transparent and a zirconia sintered body that can be visually recognized as opaque.

The zirconia sintered body according to the present embodiment preferably has a structure where the transparent zirconia portion and the opaque zirconia portion are sintered, and more preferably has a structure that has been sintered in a state where the transparent zirconia portion and the opaque zirconia portion form an interface. The interface more preferably does not have a gap. "Does not have a gap" means a state where an interface between the transparent zirconia portion and the opaque zirconia portion is formed enough that the strength of the zirconia sintered body according to the present embodiment is achieved, and the zirconia sintered body according to the present embodiment may have fine defects that do not affect the strength of the zirconia sintered body. By having a structure in which the transparent zirconia portion and the opaque zirconia portion are joined without the introduction of a third component such as a binder between them, the zirconia sintered body according to the present embodiment is a sintered body configured by an integral sintered structure and fracture origin are reduced. In addition, by having a structure that has been sintered in a state where the transparent zirconia portion and the opaque zirconia portion form an interface, mechanical strength is more readily increased.

Moreover, by having a structure in which the transparent zirconia portion and the opaque zirconia portion are joined without the introduction of a third component between them, the zirconia sintered body according to the present embodiment contains a grain structure having a crystal grain structure in which crystal grains of the transparent zirconia portion and crystal grains of the opaque zirconia portion are sintered. Therefore, such a zirconia sintered body differs from a zirconia sintered body that does not have this grain structure or a zirconia joined body where two or more zirconia sintered bodies are simply fitted together. That is, the zirconia sintered body according to the present embodiment is a joined body in a state where the transparent zirconia portion and the opaque zirconia portion are joined by sintering, and differs from a joined body in a state where a transparent zirconia portion and an opaque zirconia portion are joined by physical force alone.

Generally, a transparent zirconia sintered body has less strength than an opaque zirconia sintered body. In contrast, by having a structure where the transparent zirconia portion is sintered to the opaque zirconia portion, the transparent zirconia portion of the zirconia sintered body according to the present embodiment tends to have greater strength than when a transparent zirconia sintered body is used alone.

The shape of the zirconia sintered body according to the present embodiment is not particularly limited, but at the least, the transparent zirconia portion and the opaque zirconia portion are preferably coplanar. In the present embodiment, "coplanar" means that the portions occupy the same flat or curved plane, and the transparent zirconia portion and the opaque zirconia portion are more preferably coplanar on a plane that is likely to be visible. By having a structure where the transparent zirconia portion and the opaque zirconia portion are arranged on the same plane, design characteristics are readily heightened.

Examples of the shape of the zirconia sintered body according to the present embodiment can include spherical, substantially spherical, disc-like, cylindrical, elliptical column, plate-like, cubic, rectangular parallelepiped, polygonal, substantially polygonal, or some other shape that corresponds to an intended use. Moreover, the shape may be a shape illustrated in FIG. 1 of Japanese Patent Laid-open Publication No. 2013-014471 or the like, for example, and may also be a shape that contains a structure where one of the transparent zirconia portion and the opaque zirconia portion is arranged so as to surround the other. A shape having a structure where the opaque zirconia portion surrounds the transparent zirconia portion is preferred.

In addition, the zirconia sintered body according to the present embodiment can be obtained by sintering, for example, a green body that is in a state where a precursor of the transparent zirconia portion and a precursor of the opaque zirconia portion are joined with no gaps. Therefore, there is a high degree of freedom in the shape of the zirconia sintered body according to the present embodiment, and a zirconia sintered body having a complex shape can also be obtained. For example, the zirconia sintered body according to the present embodiment may contain a structure in which one of the transparent zirconia portion and the opaque zirconia portion has an uneven surface shape and the other is stacked atop it so as to fit together with the uneven surface shape.

The ratio of the transparent zirconia portion to the opaque zirconia portion in the zirconia sintered body according to the present embodiment can be selected arbitrarily for the desired aesthetics and shape. An example of a volume ratio may be transparent zirconia portion:opaque zirconia portion=1:99 to 99:1.

The zirconia sintered body according to the present embodiment may have a structure in which one of the transparent zirconia portion and the opaque zirconia portion forms a pattern on the surface of the other. In this example, "pattern" refers to a line drawing, diagram, or a combination of both in a portion of the zirconia sintered body according to the present embodiment that is visible, such as the surface, where the line drawing, diagram, or combination thereof is configured by one of the transparent zirconia portion and the opaque zirconia portion that is shaped on the other zirconia portion. Examples of a line drawing may include a line such as a solid line, dashed line, or wavy line; numbers or letters; symbols, and the like. Examples of a diagram may include a geometric shape such as a polygon, for example a triangle, rectangle, or pentagon; a circle; or an oval. Examples of the pattern may include, for example, a pattern formed in a region of 1 cm$^2$ or less, moreover a region of 1 mm$^2$ or less, still further a region of 0.5 mm$^2$ or less, still further a region of 0.05 mm$^2$ or less, and still further a region of 0.005 mm$^2$ or less. Furthermore, examples may include a line drawing configured by lines that are 150 μm thick, line drawings or diagrams at intervals of 150 μm, and a diagram 1 mm or less in diameter, or still further 0.5 mm or less in diameter.

Since it has particularly superior aesthetic qualities, the zirconia sintered body according to the present embodiment preferably does not have color bleed. Color bleed is believed to derive from a coloring element in one of the transparent zirconia portion and the opaque zirconia portion being at or above a certain amount and dispersing into the other zirconia portion. In this example, "coloring element" refers to an element that causes a coloration effect in zirconia and the state thereof is not limited to, for example, ions, oxides, composite oxides, or the like. In the present embodiment, "color bleed" is a state where the coloring element of one of the transparent zirconia portion and the opaque zirconia portion is included in the other. For the most part, color bleed is observed with the naked eye or by optical microscope at, or in a region near, the interface between the transparent zirconia portion and the opaque zirconia portion (also referred to as a "transition region" hereafter).

The content of a coloring element in a region of the transparent zirconia portion at 20 μm or less from the interface is preferably 0.5 mass % or less, and more preferably 0.3 mass % or less because this yields a zirconia sintered body having even more superior aesthetic qualities.

The content of a coloring element in the transition region can be measured using composition analysis by EPMA, or the like.

In the zirconia sintered body according to the present embodiment, an example of a density (also referred to as "measured density" below) found by a ratio of volume measured by Archimedes' method to mass measured by mass measurement (g/cm$^3$) is, for example, 5.8 g/cm$^3$ or more and 6.10 g/cm$^3$ or less, and still further 5.9 g/cm$^3$ or more and 6.0 g/cm$^3$ or less.

The relative density of the zirconia sintered body according to the present embodiment is preferably 99.5% or more, more preferably 99.7% or more, and still more preferably 99.9% or more.

In the present embodiment, the relative density of the zirconia sintered body can be found using the following formula.

Relative density (%)=Measured density of zirconia sintered body (g/cm$^3$)/apparent true density of zirconia sintered body (g/cm$^3$)×100

The measured density of the zirconia sintered body (sintered body density) is the density found by Archimedes' method. The apparent true density of the zirconia sintered body is the density calculated with the formula below, using the apparent true density and volume ratio of each of the transparent zirconia portion and the opaque zirconia portion.

$$M=(Ma \cdot X+Mb \cdot Y)/(X+Y)$$

In the above formula, M is the apparent true density (g/cm$^3$) of the zirconia sintered body, Ma is the apparent true density (g/cm$^3$) of the transparent zirconia portion, Mb is the apparent true density (g/cm$^3$) of the opaque zirconia portion, X is the volume ratio of the transparent zirconia portion relative to the volume of the zirconia sintered body, and Y is the volume ratio of the opaque zirconia portion relative to the volume of the zirconia sintered body. Ma and Mb are the respective densities of the HIP-treated body of each sintered body, measured by Archimedes' method. The HIP treated body is a sintered body having a density equivalent to 100% relative density, and a primary sintered body having a relative density of 97% or more and less than 100% can be manufactured through a one hour-long HIP treatment at 150 MPa and 1500° C. using argon as a pressure medium.

The zirconia sintered body according to the present embodiment has a biaxial bending strength of 300 MPa or more. When the biaxial bending strength is less than 300 MPa, the zirconia sintered body is likely to break and its utility is limited. The zirconia sintered body according to the present embodiment can be applied to a member for which greater strength is sought, and therefore the biaxial bending strength is preferably 350 MPa or more, more preferably 400 MPa or more, 450 MPa or more, 500 MPa or more, or 600 MPa or more. In addition, examples of the biaxial bending strength of the present embodiment may include 2000 MPa or less, and furthermore 1000 MPa or less, 900 MPa or less, or 800 MPa or less.

The biaxial bending strength in the present embodiment can be measured using a method in line with biaxial bending strength measurement defined by ISO/DIS 6872.

A plurality of support points (supports) for arranging a measured sample are used in the biaxial bending strength measurement. The supports are arranged such that an interface surrounding the transparent zirconia portion or opaque zirconia portion of the measured sample lies within a circle that links each support (support circle). The biaxial bending strength may be measured by applying a load to the measured sample that is arranged such that the interface lies within the support circle, the load being smaller in size than the interface and being applied at the center of mass of a support diameter. For example, when using a zirconia sintered body having a shape in which a disc-like transparent zirconia portion 5 mm in diameter is encircled by an opaque zirconia portion, supports can be arranged at three or more points (for example, three to five ceramic balls) such that the diameter of the support circle is greater than 5 mm. In the measurement, a load can be applied to the center of mass (center) of the support circle using a stylus head that is less than 5 mm in diameter.

Figure 1B:
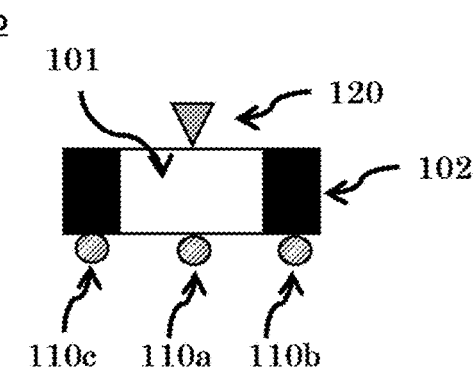

FIGS. 1A and 1B are schematic diagrams illustrating measurement of the biaxial bending strength, and show a zirconia sintered body arranged on supports. FIG. 1A is a view of the zirconia sintered body from below (that is, the surface where the zirconia sintered body is in contact with the supports) during a biaxial bending strength test. FIG. 1B shows a cross-section of the zirconia sintered body. The supports (110a through 110c) are arranged such that the transparent zirconia portion (101) lies within the support circle. The zirconia sintered body is arranged such that the opaque zirconia portion (102) is arranged on top of each support. By applying a load (120) to a position at the center of mass of the support circle, the biaxial bending strength can be measured.

In the present embodiment, the "transparent zirconia portion" is configured by a zirconia sintered body that has transparency and through which light passes clearly. Moreover, the transparent zirconia portion is preferably configured by a zirconia sintered body that may be visually recognized as transparent, more preferably by a colorless zirconia sintered body, and still more preferably by a zirconia sintered body that has high transmittance (particularly linear transmittance) of incident light.

The transparent zirconia portion preferably has a in-line transmittance of 50% or more. When the in-line transmittance is 50% or more, the transparent zirconia portion is readily visually recognized as being transparent. The in-line transmittance is more preferably 60% or more, and still more preferably 70% or more. Accordingly, the transparent zirconia portion possesses aesthetic qualities that are particularly appropriate for uses such as a cover material for a timepiece or as a member for a display on an electronic device, for example. An example of the in-line transmittance of the transparent zirconia portion may be 75% or less.

In the present embodiment, "in-line transmittance" refers to in-line transmittance in a D65 light source with a sample thickness of 1 mm. The "in-line transmittance" fulfills the relationship in the following formula.

$$Ti=Tt-Td$$

Tt: Total luminous transmittance (%)
Td: Diffuse transmittance (%)
Ti: In-line transmittance (%)

The D65 light source is one of the light source standards that is representative of a standard light source defined by the International Commission on Illumination (Commission internationale l'eclairage (CIE)). This light source provides light that corresponds to natural daylight. Accordingly, when the zirconia sintered body according to the present embodiment is fashioned to a sample thickness of 1 mm, a range where the in-line transmittance is 50% or more, moreover 60% or more, and still further 70% or more can be verified, and with this the zirconia sintered body according to the present embodiment may be verified to have a transparent zirconia portion.

The transparent zirconia portion is preferably a zirconia sintered body that contains zirconia having a cubic fluorite structure, more preferably is a zirconia sintered body where the zirconia having a cubic fluorite structure is the main phase, and still more preferably is a zirconia sintered body configured by zirconia having a cubic fluorite structure.

The average crystal grain size of the zirconia sintered body in the transparent zirconia portion is preferably 5 μm or more, 10 μm or more, or 15 μm or more, and, 200 μm or less, 100 μm or less, 50 μm or less or 30 μm or less, more preferably 5 μm or more and 200 μm or less. In the present embodiment, the average crystal grain size is the average size of zirconia crystal grains in the zirconia sintered body, which can be found with an intercept method, using an observation image obtained by a scanning electron microscope (SEM). The average crystal grain size can be found by observing a surface of the sintered body at 15,000 times magnification, extracting 200 or more, and more preferably 250±30, zirconia crystal grains from the resulting SEM observation image, measuring the crystal grain size using the intercept method (k=1.78), and taking the average thereof. Examples of the average crystal grain size measurement may include using a scanning electron microscope (device name: JSM-IT100, mfd. by JEOL), analyzing an SEM observation image obtained under the measurement conditions given below with the intercept method using commercially available analysis software (product name: InTouch Scope), and finding the average value of the grain size obtained.

Acceleration voltage: 10 kV
Measurement magnification: 400 to 10,000 times

The transparent zirconia portion may have any composition so long as the sintered body exhibits transparency. Examples of the transparent zirconia portion may include those configured by zirconia containing a stabilizer and titania ($TiO_2$).

Examples of the stabilizer may include at least one selected from a group of yttria ($Y_2O_3$), calcia (CaO), and magnesia (MgO). Yttria is preferred.

The stabilizer content in the transparent zirconia portion is preferably a respective amount that stabilizes the zirconia in the cubic fluorite structure. For example, when the stabilizer is yttria, examples of the yttria content may include 6 mol % or more and 12 mol % or less, preferably 7 mol % or more and 12 mol % or less, more preferably 8 mol % or more and 11 mol % or less, and still more preferably 8 mol % or more and 10 mol % or less.

In the present embodiment, the stabilizer content is a ratio (mol %) of the stabilizer to the total of the oxide-converted stabilizer and zirconia ($ZrO_2$) and is a value found by {[stabilizer (mol)]/[zirconia (mol)+stabilizer (mol)]}×100.

In order to facilitate increasing the transparency of the transparent zirconia portion, examples of titania content in the transparent zirconia portion may include 3 mol % or more to 20 mol % or less, preferably 5 mol % or more to 15 mol % or less, and more preferably 8 mol % or more to 12 mol % or less.

In the present embodiment, the titania content is a ratio (mol %) of titania ($TiO_2$) to the total of the zirconia, stabilizer, and titania and is a value found by {[titania (mol)]/[zirconia (mol)+stabilizer (mol)+titania (mol)]}×100.

In addition to unavoidable impurities such as hafnia ($HfO_2$), the transparent zirconia portion may also contain a coloring element or the like as long as the component does not impair transparency. An example of the transparent zirconia portion may, for example, contain 0 mass % or more and 0.1 mass % or less of aluminum in terms of $Al_2O_3$.

The "opaque zirconia portion" is configured by a zirconia sintered body through which light does not pass clearly and that does not have transparency. In addition, the opaque zirconia portion is configured by an opaque zirconia sintered body that is any one of a dark-colored zirconia sintered body, a medium-light-colored zirconia sintered body, or a light-colored zirconia sintered body. The opaque zirconia portion is preferably configured by a zirconia sintered body having low incident light transmittance.

The in-line transmittance of the opaque zirconia portion is preferably less than 5%, more preferably less than 4%, still more preferably less than 3%, and even more preferably less than 2%. When the zirconia sintered body has in-line transmittance of less than 5%, the zirconia sintered body is readily visually recognized as being opaque. In at least one of a situation where all incident light is reflected and a situation where all transmitted light is diffused in transmission, the in-line transmittance of the zirconia sintered body is 0%. Therefore, an example of the in-line transmittance of the opaque zirconia portion may be 0% or more. Accordingly, when the zirconia sintered body according to the present embodiment is fashioned to a sample thickness of 1 mm, by including a range for the in-line transmittance of less than 50%, moreover less than 10%, still further less than 5%, still further less than 4%, and still further less than 2%, the zirconia sintered body may be verified to have an opaque zirconia portion.

The opaque zirconia portion is preferably a zirconia sintered body that contains zirconia having a tetragonal fluorite structure, more preferably a zirconia sintered body where zirconia having a tetragonal fluorite structure is the main phase, and still more preferably a zirconia sintered body configured by zirconia having a tetragonal fluorite structure.

The average crystal grain size of the zirconia contained in the opaque zirconia portion is preferably 0.1 μm or more and 50 μm or less.

The opaque zirconia portion is a zirconia sintered body that lacks transparency and may have any composition so long as the sintered body is an opaque zirconia sintered body. An example of a preferred composition of the opaque zirconia portion may include zirconia containing a stabilizer and titania, and preferably is configured by a coloring element and zirconia contains a stabilizer and titania, as the remainder.

Examples of the stabilizer contained in the opaque zirconia portion may include at least one selected from a group of yttria, calcia, and magnesia. Yttria is preferred.

The stabilizer content is preferably a respective amount that stabilizes the zirconia in the tetragonal fluorite structure. For example, when the stabilizer is yttria, examples of the yttria content in the opaque zirconia portion may include 2 mol % or more and 6 mol % or less, preferably 2 mol % or more and 4 mol % or less, and more preferably 2.5 mol % or more and 3.5 mol % or less.

There is a tendency for mechanical strength to increase, and so examples of titania content in the opaque zirconia portion may include 1 mol % or more and 7 mol % or less, preferably 1.5 mol % or more and 6 mol % or less.

In the zirconia sintered body according to the present embodiment, the transparent zirconia portion and the opaque zirconia portion preferably contain zirconia that contains a stabilizer and titania.

When the transparent zirconia portion and the opaque zirconia portion each contain titania, the opaque zirconia portion preferably has a lower titania content than the transparent zirconia portion, and more preferably the difference in the titania content between the transparent zirconia portion and the opaque zirconia portion is 2 mol % or more and 10 mol % or less, more preferably 3 mol % or more and 7 mol % or less.

The opaque zirconia portion is configured by an opaque zirconia sintered body that is any one of a dark-colored zirconia sintered body, a medium-light-colored zirconia sintered body, and a light-colored zirconia sintered body. The opaque zirconia sintered body is a zirconia sintered body that does not have transparency, and the dark-colored zirconia sintered body, the medium-light-colored zirconia sintered body, and the light-colored zirconia sintered body are, respectively, a zirconia sintered body that exhibits a dark color tone, a zirconia sintered body that exhibits a mid-range color tone between a bright color tone and a dark color tone, and a zirconia sintered body that exhibits a bright color tone.

An example of the opaque zirconia sintered body may include a zirconia sintered body in which a lightness L* (hereafter referred to simply as "L*") in the L*a*b* color system is 0 or more. However, L* is preferably 8 or more, more than 10, or 15 or more, and is 100 or less, 80 or less, or 75 or less.

The dark-colored zirconia sintered body may, for example, be a zirconia sintered body where L* is 0 or more and 30 or less, but is preferably 8 or more, or more than 10. A zirconia sintered body where L* is 12 or more or 15 or more, and 30 or less or 25 or less is more preferred. One that is 18 or more and 30 or less is even more preferred.

The medium-light zirconia sintered body is preferably a zirconia sintered body where L* is more than 30 and 60 or less. A zirconia sintered body where L* is 40 or more or 45 or more, and 60 or less, 55 or less, or 50 or less is more preferred. One that is 48 or more and 60 or less is even more preferred.

The light zirconia sintered body is preferably a zirconia sintered body where L* is more than 60 and 100 or less. A zirconia sintered body where L* is more than 60, 62 or more, or 70 or more and 98 or less, 95 or less, 80 or less, or 75 or less is more preferred. One that is 65 or more and 95 or less is even more preferred.

The specific color tone exhibited by the opaque zirconia portion is subject to user discretion. For example, for a dark color, the color tone may be any one of dark orange, dark yellow, dark red, dark purple, dark green, dark yellow-green, dark blue-green, dark blue, gray, or black. For a medium-light color, the color tone may be any one of orange, yellow, red, purple, green, yellow-green, blue-green, blue, gray, or pale gray, for example. For a light color, the color tone may be any one of pale orange, pale pink, pale yellow, pale red, pale purple, pale green, pale yellow-green, pale blue-green, pale blue, pale gray, or white. However, the color tone of the opaque zirconia portion is preferably a color tone other than black.

Examples of a color tone with greater profound feeling and heightened aesthetic qualities may include at least one of blue, dark blue, and black. Examples of a more generic color tone may include at least one of white, pale gray, gray, and black. Examples of a color tone with rich decorative characteristics may include any one selected from a group of red, dark red, pale red, yellow, dark yellow, pale yellow, orange, pale orange, and dark orange.

The color tone of a dark color is preferably any one selected from a group of color tones from dark orange to dark yellow, color tones from dark red to dark purple, color tones from dark green to dark yellow-green, color tones from dark blue-green to dark blue, and color tones from gray to black. The color tone of a medium-light color is preferably any one selected from a group of color tones from orange to yellow, color tones from red to purple, color tones from green to yellow-green, color tones from blue-green to blue, and color tones from gray to pale gray. The color tone of a light color is preferably any one selected from a group of color tones from pale orange to pale yellow, color tones from pale red to pale purple, color tones from pale green to pale yellow-green, color tones from pale blue-green to pale blue, and color tones from pale gray to white.

When the color tone exhibited by the opaque zirconia portion is expressed in the L*a*b* color system, examples of the color tone may include the following L* and chroma a*b* (chroma a*b* may also be referred to individually as "a*" and "b*" below).

- L*: 0 or more, more than 10, or 15 or more, and 100 or less, 80 or less, or 75 or less;
- a*: −100 or more, −50 or more, or 0 or more, and 100 or less, 50 or less, or 30 or less; and
- b*: −100 or more, −50 or more, or 0 or more, and 100 or less, 50 or less, or 30 or less.

The color tone of the opaque zirconia portion is in the L*a*b* noted above, and moreover, when expressed in the L*a*b* color system, examples may include those that do not include color tones where L* is 10 or more, a* is −2 or more and 2 or less, and b* is −2 or more and 5 or less. The color tone expressed by L*a*b* in the present embodiment is preferably the color tone in a state where the component has been sintered in a reducing atmosphere and then sintered in an oxidizing atmosphere.

Meanwhile, the following ranges can serve as examples of the L*a*b* ranges for each color tone.

Color tones from dark orange to dark yellow:
- L* is 0 or more and 30 or less, more than 10 and 30 or less, or 15 or more and 30 or less;
- a* is −5 or more and 100 or less, preferably −5 or more and 30 or less; and
- b* is 5 or more and 100 or less, preferably 5 or more and 30 or less.

Color tones from dark red to dark purple:
- L* is 0 or more and 30 or less, more than 10 and 30 or less, or 15 or more and 30 or less;
- a* is 5 or more and 100 or less, preferably 5 or more and 30 or less; and
- b* is −100 or more and 5 or less, preferably −30 or more and 5 or less.

Color tones from dark green to dark yellow-green:
- L* is 0 or more and 30 or less, more than 10 and 30 or less, or 15 or more and 30 or less;
- a* is −100 or more and −5 or less, preferably −30 or more and −5 or less; and
- b* is −5 or more and 100 or less, preferably −5 or more and 30 or less.

Color tones from dark blue-green to dark blue:
- L* is 0 or more and 30 or less, more than 10 and 30 or less, or 15 or more and 30 or less;
- a* is −100 or more and 5 or less, preferably −30 or more and 5 or less; and
- b* is −100 or more and −5 or less, preferably −30 or more and −5 or less.

Color tones from gray to black:
- L* is 0 or more and 30 or less, more than 10 and 30 or less, or 15 or more and 30 or less;
- a* is more than −5 and less than 5, preferably −3 or more and 2 or less; and
- b* is more than −5 and less than 5, preferably −2 or more and 4 or less.

Color tones from orange to yellow:
- L* is more than 30 and 60 or less, 40 or more and 60 or less, or 45 or more and 60 or less;
- a* is −5 or more and 100 or less, preferably −5 or more and 30 or less, or 10 or more and 40 or less; and
- b* is 5 or more and 100 or less, preferably 5 or more and 30 or less, or 15 or more and 80 or less.

Color tones from red to purple:
- L* is more than 30 and 60 or less, preferably 45 or more and 60 or less;
- a* is 5 or more and 100 or less, preferably 5 or more and 30 or less; and
- b* is −100 or more and 5 or less, preferably −30 or more and 5 or less.

Color tones from green to yellow-green:
- L* is more than 30 and 60 or less, preferably 45 or more and 60 or less;
- a* is −100 or more and −5 or less, preferably −30 or more and −5 or less; and
- b* is −5 or more and 100 or less, preferably −5 or more and 30 or less.

Color tones from blue-green to blue:
- L* is more than 30 and 60 or less, preferably 45 or more and 60 or less;
- a* is −100 or more and 5 or less, preferably −30 or more and 5 or less; and
- b* is −100 or more and −5 or less, preferably −30 or more and −5 or less.

Color tones from gray to pale gray:
- L* is more than 30 and 60 or less, preferably 45 or more and 60 or less;
- a* is more than −5 and less than 5, preferably −3 or more and 2 or less; and
- b* is more than −5 and less than 5, preferably −2 or more and 4 or less, or −3 or more and 3 or less.

Color tones from pale orange to pale yellow:
- L* is more than 60 and 100 or less, preferably 62 or more and 98 or less;
- a* is −5 or more and 100 or less, preferably −5 or more and 40 or less; and
- b* is 5 or more and 100 or less, preferably 5 or more and 30 or less.

Color tones from pale red/pale pink to pale purple:
- L* is more than 60 and 100 or less, preferably 62 or more and 98 or less, or more than 60 and 80 or less;
- a* is 5 or more and 100 or less, preferably 5 or more and 40 or less, or 10 or more and 35 or less, or more than 10 and 25 or less; and
- b* is −100 or more and 5 or less, preferably −30 or more and 5 or less.

Color tones from pale green to pale yellow-green:
- L* is more than 60 and 100 or less, preferably 62 or more and 98 or less;
- a* is −100 or more and −5 or less, preferably −40 or more and −5 or less, or −10 or more and −5 or less; and
- b* is −5 or more and 100 or less, preferably −5 or more and 30 or less.

Color tones from pale blue-green to pale blue:
- L* is more than 60 and 100 or less, preferably 62 or more and 98 or less;
- a* is −100 or more and 5 or less, preferably −40 or more and 5 or less; and
- b* is −100 or more and −5 or less, preferably −30 or more and −5 or less.

Color tones from pale gray to white:
- $L^*$ is more than 60 and 100 or less, preferably 62 or more and 98 or less;
- $a^*$ is more than −5 and less than 5, preferably −3 or more and 2 or less; and
- $b^*$ is more than −5 and less than 5, preferably −2 or more and 4 or less.

The color tone according to the $L^*a^*b^*$ color system may be obtained by measuring a sintered body having a surface roughness (Ra) of 0.02 nm or less using a method in line with JIS Z 8722. The color tone can be measured using a common colorimeter (for example, a Spectrophotometer SD 3000, mfd. by Nippon Denshoku Industries). Examples may include measuring the color tone using a white plate as a background (so-called "white back measurement") and conducting the measurement under the following conditions:

Light source: D65 light source
View angle: 10°
Measurement method: SCE

In order to cause such a color tone to be expressed, the opaque zirconia portion preferably contains an element that causes a coloring effect in zirconia (hereafter also referred to as a "coloring element;" a coloring element that exhibits a red color may be referred to as a "red color element," for example, and coloring elements that cause each color tone may also be respectively referred to as a "~color element"). The color tone of the opaque zirconia portion can be changed as desired by the type and combination, as well as the content amount, of a coloring element. Examples of the coloring element in the opaque zirconia portion may include, for example, at least one selected from a group of transition metal elements, alkali metal elements, alkaline earth metal elements, aluminum (Al), silicon (Si), boron (B), phosphorus (P), germanium (Ge), and rare earth elements, and is preferably at least one selected from a group of aluminum, silicon, nickel (Ni), cobalt (Co), manganese (Mn), iron (Fe), cadmium (Cd), vanadium (V), cerium (Ce), praseodymium (Pr), neodymium (Nd), europium (Eu), holmium (Ho), erbium (Er), and thulium (Tm).

Examples of a dark orange color element may include one or more selected from a group of aluminum, iron, cobalt, cerium, and praseodymium, and is preferably at least one of cerium and praseodymium.

Examples of an orange color element may include one or more selected from a group of aluminum, iron, cobalt, cerium, praseodymium, and erbium, and is preferably at least one of cerium and praseodymium.

Examples of a pale orange color element may include at least one of cerium and praseodymium.

Examples of a dark yellow color element may include one or more selected from a group of aluminum, silicon, iron, vanadium, and praseodymium, and is preferably at least one of vanadium and praseodymium.

Examples of a yellow color element may include one or more selected from a group of silicon, iron, vanadium, and praseodymium, and is preferably at least one of vanadium and praseodymium.

Examples of a pale yellow color element may include one or more selected from a group of silicon, iron, vanadium, and praseodymium, and is preferably at least one of vanadium and praseodymium.

Examples of a dark red color element may include at least one of cadmium and cerium. Cerium is preferred.

Examples of a red color element may include at least one of cadmium and cerium. Cerium is preferred.

Examples of a pale red to pale pink color element may include at least one of aluminum, cadmium, cerium, europium, holmium, and erbium, and is preferably at least one of cerium and erbium.

Examples of a dark purple color element may include one or more selected from a group of cobalt, manganese, and neodymium. Neodymium is preferred.

Examples of a purple color element may include one or more selected from a group of aluminum, cobalt, manganese, iron, and neodymium. Neodymium is preferred.

Examples of a pale purple color element may include one or more selected from a group of cobalt, manganese, and neodymium. Neodymium is preferred.

Examples of a dark green color element may include one or more selected from a group of nickel, vanadium, praseodymium, and thulium. Nickel is preferred.

Examples of a green color element may include one or more selected from a group of nickel, vanadium, praseodymium, and thulium. Nickel is preferred.

Examples of a pale green color element may include one or more selected from a group of nickel, vanadium, praseodymium, and thulium. Nickel is preferred.

Examples of a dark yellow-green color element may include one or more selected from a group of aluminum, silicon, nickel, iron, vanadium, praseodymium, and thulium, and is preferably at least one of vanadium and thulium.

Examples of a yellow-green color element may include one or more selected from a group of aluminum, silicon, nickel, cobalt, iron, vanadium, praseodymium, and thulium, and is preferably at least one of vanadium and thulium.

Examples of a pale yellow-green color element may include one or more selected from a group of silicon, nickel, iron, vanadium, praseodymium, and thulium, and is preferably at least one of vanadium and thulium.

Examples of a dark blue-green color element may include one or more selected from a group of nickel, cobalt, iron, vanadium, praseodymium, neodymium, and thulium, and is preferably at least one of cobalt and vanadium.

Examples of a blue-green color element may include one or more selected from a group of nickel, cobalt, vanadium, praseodymium, neodymium, and thulium, and is preferably at least one of cobalt and vanadium.

Examples of a pale blue-green color element may include one or more selected from a group of aluminum, nickel, cobalt, vanadium, praseodymium, neodymium, and thulium, and is preferably at least one of cobalt and vanadium.

Examples of a dark blue color element may include one or more selected from a group of cobalt, iron, and neodymium. Cobalt is preferred.

Examples of a blue color element may include at least one of cobalt and neodymium. Cobalt is preferred.

Examples of a pale blue color element may include one or more selected from a group of aluminum, nickel, cobalt, and neodymium. Cobalt is preferred.

Examples of a gray or pale gray color element may include aluminum.

Examples of black color element may include one or more selected from a group of aluminum, cobalt, manganese, and iron, and is preferably at least one of cobalt and iron.

Examples of a white color element may include at least one of silicon and aluminum. Aluminum is preferred.

The opaque zirconia portion may also contain unavoidable impurities such as hafnia, but it is preferred that the opaque zirconia portion not contain zinc (Zn) or chrome (Cr). Examples of the zinc and chrome content may include less than 0.1 mass %, and moreover 0.05 mass % or less, respectively. Being at or below a detection limit in a common composition analysis (for example, 0.005 mass % or less) is preferred. The total content of zinc and chrome is an oxide-converted content, which is the ratio of the total mass of zinc converted to zinc oxide (ZnO) and chrome converted to chrome oxide ($Cr_2O_3$) relative to the mass of the opaque zirconia portion.

A monocline crystal rate in the opaque zirconia portion is preferably 10% or less, more preferably 6.5% or less, still more preferably 2% or less, and even more preferably 1% or less. The monocline crystal rate is a value found from the XRD pattern of the surface of the sintered body, using the following formula.

Monocline crystal rate (%)=$[I_m(111)+I_m(11\text{-}1)]\times 100/[I_m(111)+I_m(11\text{-}1)+I_t(111)+I_c(111)]$ In the above formula, $I_m(111)$ is the integrated peak area intensity of the (111) surface of a monoclinic zirconia, $I_m(11\text{-}1)$ is the integrated peak area intensity of the (11-1) surface of the monoclinic zirconia, $I_t(111)$ is the integrated peak area intensity of the (111) surface of a tetragonal zirconia, and $I_c(111)$ is the integrated peak area intensity of the (111) surface of a cubic zirconia. The XRD pattern of the sintered body can be exemplified by carrying out a measurement under the following conditions using a common XRD device (for example, device name: RINT-Ultima III, mfd. by Rigaku Corporation).

Radiation source: CuK α rays (λ=0.15418 nm)
Measurement mode: Continuous scan
Scan speed: 4°/min
Step width: 0.02°
Measurement range: 2θ=26° to 33°

In addition, the peak intensity of each surface can be found by analyzing the obtained XRD pattern using commercially available analysis software (for example, PDXL2 (Version 2.6.1.2), mfd. by Rigaku Corporation).

The average crystal grain size of the zirconia contained in the opaque zirconia portion is preferably 3.0 μm or less, and more preferably 2.5 μm or less. Examples of particularly preferred average crystal grain sizes may include 0.3 μm or more and 2.5 μm or less, and more particularly 0.5 μm or more and 1.3 μm or less.

The zirconia sintered body according to the present embodiment can be used not only for applications where a known zirconia sintered body is appropriate, but also as various components such as a component of a cellular telephone device, a decorative component, or a jewelry item.

Next, a manufacturing method of the zirconia sintered body according to the present embodiment is described.

The zirconia sintered body according to the present embodiment can be manufactured with a manufacturing method that includes a sintering process in which a primary green body, configured by one of a raw material powder for a transparent zirconia portion and a raw material powder for an opaque zirconia portion, and a green body configured by the other raw material powder are laminated to create a secondary green body, and the secondary green body is sintered.

The green body provided to the sintering process is the secondary green body (also referred to simply as a "secondary green body" below) in which the primary green body (also referred to simply as a "primary green body" below) that is configured by one of a raw material powder for the transparent zirconia portion (also referred to as a "transparent raw material" below) and a raw material powder for the opaque zirconia portion (also referred to as an "opaque raw material" below) and a green body configured by the other raw material powder are laminated.

The primary green body is one of a green body configured by the transparent raw material (also referred to as a "transparent green body" below) and a green body configured by the opaque raw material (also referred to as an "opaque green body" below). The secondary green body is a green body in which the primary green body is laminated with a green body configured by the other raw material powder, and is configured by the transparent green body and the opaque green body. In a preferred embodiment, the secondary green body is a green body in a state where the transparent green body and the opaque green body are joined. The terms "primary" and "secondary" in reference to the green bodies are used for the sake of convenience to indicate the laminated state and do not indicate which is on top or any other laminating order.

The respective shape of the primary green body and secondary green body are each subject to user discretion and may have a similar shape to that desired for the sintered body, with consideration for contraction due to sintering. Moreover, in the secondary green body, the primary green body may have a form with at least one of a convex shape and a concave shape, and the green body configured by the other raw material powder may have a form that stacks thereon so as to cover the form of the primary green body.

Any manufacturing method may be used for the primary green body and the secondary green body. Examples of a molding method may include a method that obtains the primary green body and the secondary green body simultaneously by first filling a die mold with the raw material powder of one of the transparent raw material and the opaque raw material, then laminating the other raw material powder on the first raw material powder, after which the powders are molded. Another example is a method in which one of the raw material powders is first filled in a die mold and molded to create the primary green body, then the other raw material powder is laminated on top of the primary green body and molded to create the secondary green body, or a method in which one of the raw material powders is filled in a die mold and molded to create the primary green body, then the primary green body is arranged in a die mold for the secondary green body and the other raw material powder is laminated on the primary green body and molded to create the secondary green body.

The molding method of the primary green body and the secondary green body can apply a respective, known molding method. Examples of the molding method may include at least one selected from the group of uniaxial pressure molding, cold isostatic pressing (CIP), slip casting, sheet forming, and injection molding, and at least one selected from the group of uniaxial pressure molding, CIP, and injection molding is preferred.

When the molding method is uniaxial pressure molding, an example of uniaxial pressure conditions may be 20 MPa or more and 70 MPa or less. When the molding method is CIP, an example of CIP conditions may be 150 MPa or more and 250 MPa or less. When the molding method is injection molding, an example of injection molding conditions may be 50 MPa or more and 150 MPa or less, and further 70 MPa or more and 130 MPa or less.

The transparent raw material is a precursor of the transparent zirconia portion, whereas the opaque raw material is a precursor of the opaque zirconia portion. The transparent raw material and the opaque raw material are usually powders having different compositions from each other, and these raw material powders have compositions that, through sintering, respectively yield a transparent zirconia sintered body and an opaque zirconia sintered body.

The transparent raw material and the opaque raw material are preferably mixed powders that each respectively contain a zirconia source, a stabilizer source, and a titania source, and more preferably are mixed powders that each respectively contain a stabilizer-containing zirconia source and a titania source. Furthermore, a transparent raw material and an opaque raw material may contain at least one of a coloring element source.

The zirconia source is zirconia or a precursor thereof, and is preferably zirconia in a state where a zirconia sol has been fired, more preferably is zirconia in a state where a zirconia sol obtained by at least one of a hydrothermal synthesis method and a hydrolysis method has been fired, and is still more preferably zirconia in a state where a zirconia sol obtained by a hydrolysis method has been fired.

A stabilizer source is a stabilizer or a precursor thereof. Examples may include one or more selected from the group of an oxide, a chloride, and a hydroxide which containing a stabilizing element. When the stabilizer is yttria, examples of the stabilizer source (yttria source) may include at least one selected from the group of yttria, yttrium chloride, and yttrium hydroxide, and at least one of yttria and yttrium chloride is preferred. When the stabilizer is calcia, examples of the stabilizer source (calcia source) may include at least one selected from the group of calcia, calcium chloride, and calcium hydroxide, and at least one of calcia and calcium chloride is preferred. When the stabilizer is magnesia, examples of the stabilizer source (magnesia source) may include at least one selected from the group of magnesia, magnesium chloride, and magnesium hydroxide, and at least one of magnesia and magnesium chloride is preferred.

The titania source is titania or a precursor thereof. Examples may include at least one selected from the group of titania, titanium chloride, titanium hydroxide, and titanium tetraisopropoxide. At least one of titania and titanium chloride is preferred, and titania is more preferred. Examples of a more preferred titania source may include a titania powder with a purity of 99.9% or higher, a BET specific surface area of 10 $m^2/g$ or more and 100 $m^2/g$ or less, an average crystallite size of 30 nm or less, and an average secondary grain size of 500 nm or less and, further, a titania powder obtained by at least one of a sulfuric acid method and a vapor phase thermal decomposition method is preferred. The titania source preferably has a larger BET specific surface area than the zirconia source and stabilizer-containing zirconia source.

The stabilizer-containing zirconia source is a zirconia in which a stabilizer is dissolved. Examples may include at least one selected from the group of yttria-containing zirconia, calcia-containing zirconia, and magnesia-containing zirconia. Yttria-containing zirconia is preferred. Examples of a preferred yttria-containing zirconia source may include an yttria-containing zirconia powder that has a purity of 99.9% or higher, a BET specific surface area of 5 $m^2/g$ or more and 20 $m^2/g$ or less, an average crystal size of 10 nm or more and 50 nm or less, and an average secondary particle size of 100 nm or more and 500 nm or less and, further, an yttria-containing zirconia powder obtained by at least one of a hydrothermal synthesis method and a hydrolysis method is preferred.

The coloring element source is included in order to give the zirconia portion the desired coloration. The coloring element source is a compound that contains the coloring element. Examples may include at least one selected from the group of oxides, hydroxides, oxyhydroxides, chlorides, sulfides, acetates, nitrates, and sulfates of coloring elements, and preferably is at least one selected from the group of oxides, hydroxides, and oxyhydroxides of coloring elements. When the coloring element is cobalt, the coloring element source (cobalt source) is a compound containing cobalt (Co). Examples may include at least one selected from the group of tricobalt tetraoxide ($Co_3O_4$), cobalt oxide (III) ($Co_2O_3$), cobalt oxide (II) (CoO), cobalt oxyhydroxide (CoOOH), cobalt hydroxide ($Co(OH)_2$), cobalt nitrate ($Co(NO_3)_2$), cobalt chloride ($CoCl_2$), and cobalt sulfate ($CoSO_4$). At least one selected from the group of $Co_3O_4$, $Co_2O_3$, CoO, and CoOOH is preferred.

When the coloring element is iron, the coloring element source (iron source) is a compound containing iron (Fe). Examples may include at least one selected from the group of iron oxide (III, II) ($Fe_3O_4$), iron oxide (III) ($Fe_2O_3$), iron oxide (II) (FeO), iron oxyhydroxide (FeOOH), iron hydroxide (FeOH), iron nitrate ($Fe(NO_3)_2$), iron chloride (FeCl), and iron sulfate ($FeSO_4$). At least one selected from the group of $Fe_3O_4$, $Fe_2O_3$, FeO, and FeOOH is preferred.

When the coloring element is aluminum, the coloring element source (aluminum source) is a compound containing aluminum (Al). Examples may include at least one selected from the group of alumina ($Al_2O_3$), aluminum hydroxide ($Al(OH)_3$), aluminum chloride ($AlCl_3$), aluminum isopropoxide ($C_9H_{21}O_3Al$), and aluminum nitrate ($Al(NO_3)_3$). At least one of alumina and aluminum hydroxide is preferred.

When the coloring element is nickel, the coloring element source (nickel source) is a compound containing nickel (Ni). Examples may include at least one selected from the group of nickel oxide (II) (NiO), nickel oxide (III) ($Ni_2O_3$), nickel carbonate ($NiCO_3$), nickel chloride ($NiCl_2$), nickel sulfate ($NiSO_4$), and nickel sulfide (NiS). At least one of NiO and $Ni_2O_3$ is preferred.

When the coloring element is manganese, the coloring element source (manganese source) is a compound containing manganese (Mn). Examples may include at least one selected from the group of manganese oxide (II) (MnO), manganese oxide (III) ($MnO_2$), manganese oxide (VII) ($Mn_2O_7$), trimanganese tetraoxide ($Mn_3O_4$), manganese sulfate ($MnSO_4$), manganese chloride ($MnCl_2$), and manganese nitrate ($Mn(NO_3)_2$). At least one selected from the group of MnO, $MnO_2$, $Mn_2O_7$, and $Mn_3O_4$ is preferred.

When the coloring element is silicon, the coloring element source (silicon source) is a compound containing silicon (Si). Examples may include at least one selected from the group of silicon monoxide (SiO), silicon dioxide ($SiO_2$), silicon carbide (SiC), silicon nitride ($Si_3N_4$), and silicon tetrachloride ($SiCl_4$). At least one of SiO and $SiO_2$ is preferred.

When the coloring element is cadmium, the coloring element source (cadmium source) is a compound containing cadmium (Cd). Examples may include at least one selected from the group of cadmium oxide (CdO), cadmium hydroxide ($Cd(OH)_2$), cadmium sulfide (CdS), cadmium chloride ($CdCl_2$), and cadmium selenide (CdSe). At least one of CdO and ($Cd(OH)_2$) is preferred.

When the coloring element is vanadium, the coloring element source (vanadium source) is a compound containing vanadium (V). Examples may include at least one selected from the group of vanadium oxide (VO), vanadium oxide (IV) ($VO_2$), vanadium oxide (III) ($V_2O_3$), vanadium oxide (V) ($V_2O_5$), vanadium carbide (VC), vanadium nitride (VN), vanadium chloride ($VCl_3$), and vanadium bromide ($VBr_2$). At least one selected from the group of $VO_2$, $V_2O_3$, and $V_2O_5$ is preferred.

When the coloring element is cerium, the coloring element source (cerium source) is a compound containing cerium (Ce). Examples may include at least one selected from the group of cerium oxide (IV) ($CeO_2$), cerium oxide (III) ($Ce_2O_3$), cerium hydroxide ($Ce(OH)_3$), cerium sulfide ($Ce_2S_3$), cerium chloride ($CeCl_4$), cerium sulfate ($Ce(SO_4)_2$), and cerium nitrate ($Ce(NO_3)_3$). At least one selected from the group of $CeO_2$, $Ce_2O_3$, and $Ce(OH)_3$ is preferred.

When the coloring element is praseodymium, the coloring element source (praseodymium source) is a compound containing praseodymium (Pr). Examples may include at least one selected from the group of praseodymium oxide (IV) ($PrO_2$), praseodymium oxide (III) ($Pr_2O_3$), hexapraseodymium undecaoxide ($Pr_6O_{11}$), praseodymium chloride ($PrCl_3$), praseodymium sulfide ($Pr_2S_3$), and praseodymium sulfate ($Pr_2(SO_4)_3$). At least one selected from the group of $PrO_2$, $Pr_2O_3$, and $Pr_6O_{11}$ is preferred.

When the coloring element is neodymium (Nd), the coloring element source (neodymium source) is a compound containing neodymium (Nd). Examples may include at least one selected from the group of neodymium oxide ($Nd_2O_3$), neodymium hydroxide ($Nd(OH)_3$), neodymium nitrate ($Nd(NO_3)_3$), and neodymium chloride ($NdCl_2$). At least one of $Nd_2O_3$ and $Nd(OH)_3$ is preferred.

When the coloring element is europium, the coloring element source (europium source) is a compound containing europium (Eu). Examples may include at least one selected from the group of europium oxide (EuO), europium oxide (II) ($Eu_2O_3$), europium hydroxide ($Eu(OH)_2$), europium sulfide (EuS), and europium nitrate ($Eu(NO_3)_3$). At least one selected from the group of EuO, $Eu_2O_3$, and $Eu(OH)_2$ is preferred.

When the coloring element is holmium, the coloring element source (holmium source) is a compound containing holmium (Ho). Examples may include at least one selected from the group of holmium oxide (III) ($Ho_2O_3$), holmium hydroxide ($Ho_2(OH)_3$), holmium nitrate ($Ho(NO_3)_3$), and holmium chloride ($HoCl_3$). At least one of $Ho_2O_3$ and $Ho_2(OH)_3$ is preferred.

When the coloring element is erbium, the coloring element source (erbium source) is a compound containing erbium (Er). Examples may include at least one selected from the group of erbium oxide (III) ($Er_2O_3$), erbium hydroxide ($Er_2(OH)_3$), erbium nitrate ($Er(NO_3)_3$), and erbium chloride ($ErCl_3$). At least one of $Er_2O_3$ and $Er_2(OH)_3$ is preferred.

When the coloring element is thulium, the coloring element source (thulium source) is a compound containing thulium (Tm). Examples may include at least one selected from the group of thulium oxide (III) ($Tm_2O_3$), thulium hydroxide ($Tm(OH)_2$), thulium nitrate ($Tm(NO_3)_3$), and thulium chloride ($TmCl_3$). At least one of $Tm_2O_3$ and $Tm(OH)_3$ is preferred.

The coloring element source may be a composite oxide, for example, cobalt aluminate ($CoAlO_4$).

The stabilizer content in the transparent raw material is preferably an amount that stabilizes the zirconia in the cubic fluorite structure through sintering. For example, when the stabilizer is yttria, examples of the yttria content may include 6 mol % or more and 12 mol % or less, preferably 7 mol % or more and 12 mol % or less, more preferably 8 mol % or more and 11 mol % or less, and still more preferably 8 mol % or more and 10 mol % or less.

Examples of titania content in the transparent raw material may include 3 mol % or more and 20 mol % or less, preferably 5 mol % or more and 15 mol % or less, and more preferably 8 mol % or more and 12 mol % or less.

The stabilizer content in the opaque raw material is preferably an amount that stabilizes the zirconia in the tetragonal fluorite structure through sintering. For example, when the stabilizer is yttria, examples of the yttria content may include 2 mol % or more and 6 mol % or less, preferably 2 mol % or more and 4 mol % or less, and more preferably 2.5 mol % or more and 3.5 mol % or less.

Examples of titania content in the opaque zirconia portion may include 1 mol % or more and 7 mol % or less, preferably 1.5 mol % or more and 6 mol % or less.

The content of coloring element source in the opaque raw material may be any amount desired according to the color tone sought, and examples may include 0.01 mass % or more and 50 mass % or less, preferably 0.1 mass % or more and 20 mass % or less, and more preferably 0.3 mass % or more and 10 mass % or less. Respective examples for the coloring element source may include, for example, 0.1 mass % or more and 5 mass % or less for the mass of cobalt, calculated in terms of $Co_3O_4$, relative to the mass of the opaque raw material; 0.1 mass % or more and 5 mass % or less for the mass of iron, calculated in terms of $Fe_2O_3$, relative to the mass of the opaque raw material; 0.1 mass % or more and 10 mass % or less for the mass of nickel, calculated in terms of NiO, relative to the mass of the opaque raw material; and 0.1 mass % or more and 40 mass % or less for the mass of aluminum, calculated in terms of $Al_2O_3$, relative to the mass of the opaque raw material In order to improve fluidity of the raw material powder, at least one of the transparent raw material and the opaque raw material may contain an organic binder. When an organic binder is included, examples of the organic binder content in each raw material powder may include 25 vol % or more and 65 vol % or less, and further 35 vol % or more and 60 vol % or less.

A known organic binder that is used when molding ceramic powder can be used, for example an organic binder that contains at least one selected from the group configured by an acrylic resin, wax, and a plasticizer. In the present embodiment, examples of the acrylic resin may include a polymer that contains at least one of an acrylic acid ester residue unit and a methacrylic acid ester residue unit.

The transparent raw material and the opaque raw material are preferably in a state where the raw material (such as the zirconia source) is uniformly mixed. Any method of mixing the raw material may be used, and may be at least one of dry mixing and wet mixing, where wet mixing is preferred. Examples of the preferred wet mixing may include mixing by at least one of a ball mill and an agitator mill. Mixing by a ball mill that uses a zirconia ball having a diameter of 1.0 mm or more and 10.0 mm or less is preferred. When a coloring element is included, preferably the coloring element source is mixed, after which the zirconia source and the coloring element source are mixed.

When the raw material powder contains an organic binder, so long as the raw material powder and the organic binder can be mixed uniformly, any mixing method may be used. Examples of the mixing method may include one of hot kneading and wet mixing.

A difference in the coefficient of linear shrinkage between the transparent raw material and the opaque raw material (also referred to simply as the "difference in shrinkage coefficient" below) is preferably 5.0% or less. Typically, there is a significant difference in the thermal shrinkage behavior of a transparent raw material and an opaque raw material, as compared to when both raw materials are transparent raw materials or when both are opaque raw materials. Therefore, when the two are sintered concurrently, defects are likely to occur and yield rate is likely to be significant lower. In contrast, by having the difference in the shrinkage coefficient in the present embodiment be 5.0% or less, defects are less likely to occur during sintering, and therefore the yield rate is likely to be higher. The difference in the shrinkage coefficient is more preferably 4.0% or less, and still more preferably 3.5% or less. It is difficult to make the respective linear shrinkage coefficients of raw material powders having different compositions match exactly, and therefore examples of the difference in shrinkage coefficient may include 0% or more, and further 0.1% or more.

"shrinkage coefficient" in the present embodiment is one indicator of thermal shrinkage behavior, and can be found using the formula below based on values obtained before and after a firing process is performed on a measured sample that is a rectangular parallelepiped sample 30 mm wide, 3 mm thick, and 40 mm long (also referred to as a "rectangular parallelepiped sample" below).

$$S=(S_W+S_T+S_L)/3$$

where:
$S_W=100\times\{(L_{w2}-L_{w1})/L_{w1}\}$
$S_T=100\times\{(L_{T2}-L_{T1})/L_{T1}\}$
$S_L=100\times\{(L_{L2}-L_{L1})/L_{L1}\}$ $S_W$ is the linear shrinkage coefficient (%) of the width, $L_{w1}$ is the width (mm) of the rectangular parallelepiped sample prior to the firing process, $L_{w2}$ is the width (mm) of the rectangular parallelepiped sample after the firing process, $S_T$ is the linear shrinkage coefficient (%) of the thickness, $L_{T1}$ is the thickness (mm) of the rectangular parallelepiped sample prior to the firing process, $L_{T2}$ is the thickness (mm) of the rectangular parallelepiped sample after the firing process, $S_L$ is the linear shrinkage coefficient (%) of the length, $L_{L1}$ is the length (mm) of the rectangular parallelepiped sample prior to the firing process, and $L_{L2}$ is the length (mm) of the rectangular parallelepiped sample after the firing process.

Examples of the firing process for measuring the linear shrinkage coefficient according to the present embodiment may include firing in air with a firing program having a heating rate of 100° C./h; a sustained temperature of one of 1300° C., 1400° C., and 1500° C.; a sustained time of one minute; and a temperature drop rate of 200° C./h.

In the present embodiment, one of the difference in the linear shrinkage coefficient in the firing process at the sustained temperature of 1300° C. (also called "$\Delta S_{W(1300)}$" below), the difference in the linear shrinkage coefficient in the firing process at the sustained temperature of 1400° C. (also called "$\Delta S_{W(1400)}$" below), and the difference in the linear shrinkage coefficient in the firing process at the sustained temperature of 1500° C. (also called "$\Delta S_{W(1500)}$" below) preferably fulfills the difference in the linear shrinkage coefficient described above. More preferably, at least the maximum value (also referred to as "$\Delta S_{W(MAX)}$" below) of $\Delta S_{W(1300)}$, $\Delta S_{W(1400)}$, and $\Delta S_{W(1500)}$ fulfills the above-noted value, and more preferably at least $\Delta SW_{(1400)}$ fulfills the above-noted value.

Examples of a preferred $\Delta S_{W(1300)}$ include 0% or more, preferably 0.1% or more, and 3.0% or less, preferably 2.0% or less, more preferably 1.0% or less. Examples of a preferred $\Delta S_{W(1400)}$ include 0% or more, preferably 0.5% or more, and 5.0% or less, preferably 4.0% or less, more preferably 3.5% or less. Examples of a preferred $\Delta S_{W(1500)}$ include 0% or more, preferably 0.1% or more, and 3.0% or less, preferably 2.0% or less, more preferably 1.0% or less. The difference between $\Delta S_{W(1300)}$ and $\Delta S_{W(1500)}$ is more preferably 0% or more and 1.0% or less, and still more preferably 0.1% or more and 0.5% or less.

In the sintering process, a zirconia sintered body can be obtained in which the transparent zirconia portion and the opaque zirconia portion are joined by sintering the secondary green body.

The sintering temperature for sintering the secondary green body preferably exceeds 1100° C., more preferably is 1200° C. or more, and still more preferably is 1250° C. or more. Any temperature that can be applied with a typical sintering device suffices for the sintering temperature. Examples may include 1700° C. or less, and further 1600° C. or less.

The sintering process can adopt any sintering method. Examples may include at least one selected from the group of atmospheric pressure sintering, microwave firing, and hot isostatic pressing (also referred to as a "HIP treatment" below). In order to inhibit the occurrence of defects at the interface between the transparent zirconia portion and the opaque zirconia portion, the sintering preferably includes at least a HIP treatment in the sintering process, and more preferably includes atmospheric pressure sintering and HIP treatment. "Atmospheric pressure sintering" in the present embodiment is a method of sintering without applying an external force to the sintering object during sintering.

Examples of a preferred sintering method may include performing sintering with atmospheric pressure sintering at 1300° C. or more and 1400° C. or less, after which HIP treatment is performed at 1450° C. or more and 1550° C. or less.

The conditions for atmospheric pressure sintering other than the sintering temperature may be any desired conditions. Examples of the sintering atmosphere may include one of an oxidizing atmosphere and air atmosphere, preferably air atmosphere, and examples of the sintering time may include 30 minutes or more and five hours or less, preferably one hour or more and three hours or less.

The conditions for HIP treatment other than the HIP treatment temperature may be any desired conditions. Examples of a pressure medium may include using an inert gas, preferably at least one of nitrogen and argon; the HIP pressure may be 50 MPa or more and 200 MPa or less; and the HIP treatment time may be 0.5 hours or more and ten hours or less. The HIP treatment atmosphere is preferably an atmosphere other than an oxidizing atmosphere, more preferably is at least one of a reducing atmosphere and an inert atmosphere, and still more preferably is a reducing atmosphere.

In the HIP treatment, the sample is preferably placed in a reducing atmosphere during HIP sintering, and the sample is preferably arranged in a vessel configured by a reducible material. Typically, a structural member such as a heating element in the HIP treatment device uses a reducible substance such as carbon. Therefore, even when an inert gas is used as the pressure medium, the HIP treatment atmosphere is likely to change from an inert atmosphere to an unstable atmosphere of a weakly reducing atmosphere. However, by placing the mid-HIP sintering sample in a reducing atmosphere, the atmosphere stabilizes and the zirconia sintered body according to the present embodiment is more readily obtained. Any method may be used to control the mid-HIP treatment atmosphere, and in particular the atmosphere in the vicinity of the mid-HIP processing sample. Arranging the sample in a vessel configured by a reducible material is convenient. Depending on the material selected for the vessel in which the sample is placed in the HIP treatment, the atmosphere in the vicinity of the sample can be stabilized. For example, by arranging the sample in a vessel made of an oxide ceramic such as alumina, zirconia, or mullite, the sample can be placed in an inert atmosphere during HIP sintering. On the other hand, by arranging the sample in a vessel configured by a reducible material such as carbon, the sample can be placed in a reducible atmosphere during HIP treatment.

In the sintering process, an annealing process is preferably performed after sintering. This further increases the in-line transmittance of the transparent zirconia portion. The conditions of the annealing process may be any desired conditions. Examples may include an oxygen atmosphere, a processing temperature of 850° C. or more and 950° C. or less, and a processing time of 0.5 to two hours.

The manufacturing method of the present embodiment may include a processing process that processes the zirconia sintered body into a desired shape. Through processing to expose the transparent zirconia portion and the opaque zirconia portion on the same surface, further smooth the surface, and make minor corrections to the shape, for example, the zirconia sintered body can be imparted with aesthetic qualities that are better suited for an intended use that is to be adopted.

Any method can be used for the processing method, and examples may include at least one selected from the group of lathe processing, surface grinding, R grinding (grinding for making curve surface), and numerical control (NC) machining. Examples can also include polishing, such as at least one of barrel polishing and R polishing (polishing for making curve surface), in order to make luster more robust.

EMBODIMENTS

Hereafter, a detailed description of a zirconia sintered body according to the present disclosure is given using embodiments and comparative examples. However, the present disclosure is not limited to the examples below.

In-Line Transmittance

A disc-shaped sintered body 1 mm thick and 25 mm in diameter is manufactured, both surfaces are mirror polished to a surface roughness Ra=0.02 μm or less, and this is used as a measured sample. The in-line transmittance is measured using a haze meter (device name: NDH 5000, mfd. by Nippon Denshoku), with a D65 source as the incident light and a diameter of 15 mm as the spot diameter.

Measurement of Color Tone

The color tone is measured in line with JIS Z 8722 using a colorimeter (device name: Spectrophotometer SD 3000, mfd. by Nippon Denshoku Industries) under conditions of a D65 light source and 10° view angle.

Biaxial Bending Strength

A disc-shaped sintered body 1 mm thick and 25 mm in diameter is manufactured, both surfaces are mirror polished to a surface roughness Ra=0.02 μm or less, and this is used as a measured sample. Using this measured sample, the biaxial bending strength is measured in line with a biaxial bending strength measurement defined by ISO/DIS 6872. In the biaxial bending strength measurement, the support size is defined to a diameter of 22 mm. Zirconia balls having a ball diameter of 9.5 mm are used as the supports.

Embodiment 1-1

Transparent Raw Material

A 10 mol % yttria-containing zirconia powder with a BET specific surface area of 5.3 m$^2$/g and titania powder with a BET specific surface area of 20 m$^2$/g are mixed in an ethanol solvent using a ball mill with a ball made of zirconia having a diameter of 10 mm. The ball mill mixing involves pulverizing the titania powder in the ethanol solvent and further mixing the yttria-containing zirconia powder. The mixed powder is dried in air, 10 mol % yttria and 9.1 mol % titania-containing zirconia powder is obtained, and this is used as the transparent raw material. The titanium (Ti) in the titania contained in the transparent raw material is equivalent to 6.8 mass % as a mass ratio of titanium, calculated in terms of $TiO_2$, relative to the mass of the transparent raw material.

Opaque Raw Material

Alumina powder, manganese oxide powder, cobalt oxide powder, and 3 mol % yttria-containing zirconia powder are wet-mixed in an ethanol solvent by a ball mill that uses a ball made of zirconia, and a mixed powder is obtained that contains 20 mass % alumina, 1.8 mass % manganese oxide, and 0.4 mass % cobalt oxide, and a remainder is 3 mol % yttria-containing zirconia. This mixed powder is dried in air at 110° C., after which it is sieved, and this is used as the opaque raw material (black color raw material).

Green Body

Figure 2:
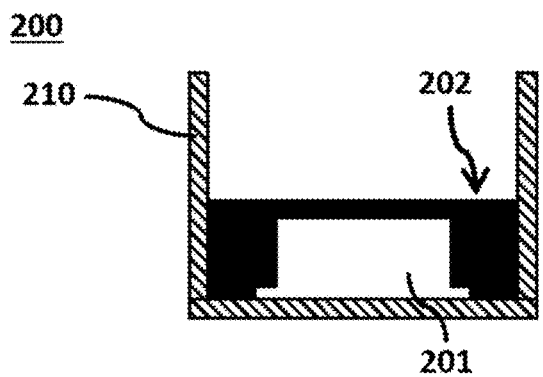
FIG. 2 is a schematic diagram showing a cross-section of a secondary green body.

The transparent raw material is filled in a disc-shaped primary die mold having a diameter of 25 mm and an uneven surface shape, and is uniaxially pressure-molded at 25 MPa of pressure, whereby a primary green body is obtained that is configured by a disc-shaped transparent green body 2 mm thick and 25 mm in diameter. The primary green body is arranged on a disc-shaped secondary die mold having a diameter of 50 mm such that a convex form on the primary green body serves as a top surface. The opaque raw material is filled so as to cover the entire top surface of the primary green body. Then, by performing uniaxial pressure molding at 50 MPa of pressure, a secondary green body is obtained in which the transparent green body and the opaque green body are laminated, after which the secondary green body undergoes CIP treatment at 200 MPa of pressure. A disc-shaped secondary green body that is 3.5 mm thick and 50 mm in diameter is thus obtained. FIG. 2 is a schematic diagram showing a cross-section of a secondary green body (200), and shows a secondary green body in which a transparent green body and an opaque green body are laminated, having a structure in which a primary green body (201) configured by the transparent green body is arranged in a secondary die mold (210) and an opaque green body (202) covers an exposed surface of the primary green body.

Zirconia Sintered Body

The resulting secondary green body undergoes atmospheric pressure sintering in air at a heating rate of 100° C./h, a sintering temperature of 1350° C., and a sintering time of two hours, after which the secondary green body undergoes HIP treatment at a temperature of 1500° C., a pressure of 150 MPa, and a sustained time of one hour. After the HIP treatment, the secondary green body is annealed in air for eight hours at 900° C. to obtain a sintered body. In the HIP treatment, 99.9% pure argon gas is used as the pressure medium and the sample is arranged in a lidded vessel made of carbon.

The sintered body after annealing is cut and polished until the transparent zirconia portion and the opaque zirconia portion are exposed on both surfaces of the sintered body. Accordingly, a 1.0 mm thick, disc-shaped zirconia sintered body is created that is provided with a transparent zirconia portion and an opaque zirconia portion in which the transparent zirconia portion and the opaque zirconia portion are exposed on the same surface, and this is used as the zirconia sintered body according to the present embodiment.

Figure 3A:
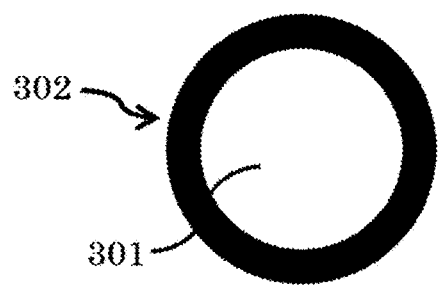
FIGS. 3A and 3B are schematic diagrams showing an outer appearance (front view and cross-sectional view, respectively) of a zirconia sintered body according to a first embodiment.
Figure 3B:
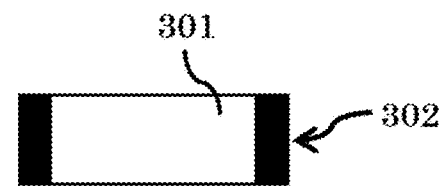

FIGS. 3A and 3B are schematic diagrams showing an outer appearance (front view (300a) and cross-sectional view (300b)) of the zirconia sintered body according to the present embodiment after cutting and polishing. As illustrated in the front view (300a), the zirconia sintered body according to the present embodiment has a structure in which an opaque zirconia portion (302) is arranged so as to surround a transparent zirconia portion (301), and moreover the zirconia sintered body has a disc shape in which the transparent zirconia portion (301) and the opaque zirconia portion (302) are exposed on the same surface. Furthermore, as illustrated in the cross-sectional view (300b), the zirconia sintered body according to the present embodiment has a structure provided with a transparent zirconia portion that is continuous in a thickness direction. Due to the transparency of the transparent zirconia portion, when the zirconia sintered body according to the present embodiment is arranged, it can function as a window member and allow a background design or the like to be visible.

Embodiment 1-2

Transparent Raw Material
The transparent raw material is obtained with a similar method as in Embodiment 1-1.
Opaque Raw Material
Alumina powder, iron oxide powder, cobalt oxide powder, and 3 mol % yttria-containing zirconia powder are wet-mixed in an ethanol solvent by a ball mill that uses a ball made of zirconia, and a mixed powder is obtained that contains 5 mass % alumina, 0.4 mass % iron oxide, and 0.04 mass % cobalt oxide, and a remainder is 3 mol % yttria-containing zirconia. This mixed powder is dried in air at 110° C., after which it is sieved, and this is used as the opaque raw material (dark orange color raw material).
Green Body
Other than using the dark orange color raw material as the opaque raw material, a disc-shaped secondary green body that is 3.5 mm thick and 50 mm in diameter is obtained with a similar method as in Embodiment 1-1.
Zirconia Sintered Body
The resulting secondary green body undergoes atmospheric pressure sintering, HIP treatment, and annealing with a similar method as in Embodiment 1-1 to yield a sintered body. The sintered body after annealing is cut and polished similarly to Embodiment 1-1 to yield a disc-shaped zirconia sintered body, which is used as the zirconia sintered body according to the present embodiment.

Embodiment 1-3

Transparent Raw Material
The transparent raw material is obtained with a similar method as in Embodiment 1-1.
Opaque Raw Material
Alumina powder, iron oxyhydroxide powder, and 3 mol % yttria-containing zirconia powder are wet-mixed in an ethanol solvent by a ball mill that uses a ball made of zirconia, and a mixed powder is obtained that contains 0.05 mass % alumina and 0.15 mass % iron oxyhydroxide, and a remainder is 3 mol % yttria-containing zirconia. This mixed powder is dried in air at 110° C., after which it is sieved, and this is used as the opaque raw material (dark yellow color raw material).
Green Body
Other than using the dark yellow color raw material as the opaque raw material, a disc-shaped secondary green body that is 3.5 mm thick and 50 mm in diameter is obtained with a similar method as in Embodiment 1-1.
Zirconia Sintered Body
The resulting secondary green body undergoes atmospheric pressure sintering, HIP treatment, and annealing with a similar method as in Embodiment 1-1 to yield a sintered body. The sintered body after annealing is cut and polished similarly to Embodiment 1-1 to yield a disc-shaped zirconia sintered body, which is used as the zirconia sintered body according to the present embodiment.

Embodiment 1-4

Transparent Raw Material
The transparent raw material is obtained with a similar method as in Embodiment 1-1.
Opaque Raw Material
Iron oxide powder, cobalt aluminate powder, and 3 mol % yttria-containing zirconia powder are wet-mixed in an ethanol solvent by a ball mill that uses a ball made of zirconia, and a mixed powder is obtained that contains 0.1 mass % iron oxide and 5.5 mass % cobalt aluminate, and a remainder is 3 mol % yttria-containing zirconia. This mixed powder is dried in air at 110° C., after which it is sieved, and this is used as the opaque raw material (dark blue color raw material).
Green Body
Other than using the dark blue color raw material as the opaque raw material, a disc-shaped secondary green body that is 3.5 mm thick and 50 mm in diameter is obtained with a similar method as in Embodiment 1-1.
Zirconia Sintered Body
The resulting secondary green body undergoes atmospheric pressure sintering, HIP treatment, and annealing with a similar method as in Embodiment 1-1 to yield a sintered body. The sintered body after annealing is cut and polished similarly to Embodiment 1-1 to yield a disc-shaped zirconia sintered body, which is used as the zirconia sintered body according to the present embodiment.

Embodiment 1-5

A mixed powder that contains 5.0 mass % nickel oxide where the remainder is 3 mol % yttria-containing zirconia is obtained by wet-mixing nickel oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 1-1.

Embodiment 1-6

Transparent Raw Material
Using a similar method as in Embodiment 1-1, 10 mol % yttria- and 9.1 mol % titania-containing zirconia powder is obtained. The titanium (Ti) in the titania contained in the mixed powder is equivalent to 6.8 mass % as a mass ratio of titanium, calculated in terms of $TiO_2$, relative to the mass of the mixed powder. An organic binder containing an acrylic resin is mixed with this powder to yield a composition, which is used as the transparent raw material of the present embodiment.
Opaque Raw Material
Alumina powder, manganese oxide powder, cobalt oxide powder, and 3 mol % yttria-containing zirconia powder are wet-mixed in an ethanol solvent by a ball mill that uses a ball made of zirconia, and a mixed powder that contains 20 mass % alumina, 1.8 mass % manganese oxide, and 0.4 mass % cobalt oxide, and a remainder is 3 mol % yttria-containing zirconia, is obtained with a similar method as in Embodiment 1-1. An organic binder containing an acrylic resin is mixed with the mixed powder to yield a composition, which is used as the opaque raw material of the present embodiment.

Green Body

The transparent raw material is injection molded in a primary die mold, and a primary green body is obtained that is configured by a disc-shaped transparent green body 2 mm thick and 25 mm in diameter with an convexoconcave surface shape. The resulting primary green body is arranged on a disc-shaped secondary die mold having a diameter of 50 mm such that the convexoconcave surface shape on the primary green body serves as a top surface. The opaque raw material is injection molded on top of the primary green body so as to cover the entire top surface (exposed surface) of the primary green body, yielding a secondary green body having a disc shape 3.5 mm thick and 50 mm in diameter in which the transparent green body and the opaque green body are laminated.

Zirconia Sintered Body

Other than using the resulting secondary green body, a zirconia sintered body according to the present embodiment is obtained by atmospheric pressure sintering, HIP treatment, annealing, and processing with a similar method as in Embodiment 1-1.

The zirconia sintered body according to the present embodiment has a disc shape 1 mm thick and has the transparent zirconia portion and the opaque zirconia portion exposed on the same surface.

Comparative Example 1

A ceramic joined body is obtained as follows, in line with Japanese Patent Laid-open Publication No. 2013-014471.

Black Zirconia Sintered Body

Black zirconia powder (product name: TZ-Black, mfd. by Tosoh) is uniaxially pressure molded at a pressure of 50 MPa, after which the powder undergoes CIP processing at a pressure of 200 MPa to yield a plate-shaped green body 30 mm long and 40 mm wide. The resulting green body undergoes atmospheric pressure sintering, after which the resulting zirconia sintered body is mechanically processed to yield a frame-like black zirconia sintered body 1.15 mm thick, 28 mm long, and 36 mm wide with an empty center that is rectangular, 1.15 mm thick, 14 mm long, and 22 mm wide.

Transparent Zirconia Sintered Body

High-purity titania powder that is 10 mol % relative to zirconia is added to 10 mol % yttria-containing zirconia powder (product name: TZ-10YS, mfd. by Tosoh), and these are mixed in an ethanol solvent with a ball mill for 72 hours using a ball made of zirconia and 10 mm in diameter, after which the mixture is dried to yield a raw material powder. The raw material powder is uniaxially pressure molded at a pressure of 50 MPa, after which the powder undergoes CIP processing at a pressure of 200 MPa to yield a plate-shaped green body 2 mm thick, 50 mm long, and 40 mm wide.

The resulting plate-shaped green body undergoes atmospheric pressure sintering in air at a heating rate of 100° C./h, a sintering temperature of 1350° C., and a sintering time of two hours to obtain an atmospheric pressure sintered body. Next, the atmospheric pressure sintered body undergoes HIP treatment at a temperature of 1650° C., a pressure of 150 MPa, and a sustained time of one hour. In the HIP treatment, 99.9% pure argon gas is used as the pressure medium and the sample is arranged in a lidded vessel made of carbon. After the HIP sintering, the sintered body is annealed in air for one hour at 1000° C. to obtain a transparent zirconia sintered body.

Ceramic Joined Body

The transparent zirconia sintered body is arranged on the interior of the black zirconia sintered body and undergoes HIP treatment at a pressure of 150 MPa, a sustained temperature of 1200° C., and a sustained time of one hour to yield a ceramic joined body. The HIP treatment is carried out at a sustained temperature of 1200° C., a pressure of 150 MPa, and a sustained time of one hour, 99.9% pure argon (Ar) gas is used as the pressure medium, and the sample is placed in a vessel made of alumina. After the HIP treatment, the resulting HIP sintered body is annealed in air for one hour at 1000° C. to obtain a zirconia joined body according to the present comparative example.

Results of a biaxial bending strength measurement for Embodiments 1-1 to 1-5 and Comparative Example 1 are given in the following table.

TABLE 1

|  | Biaxial bending strength (MPa) |
| --- | --- |
| Embodiment 1-1 | 484 |
| Embodiment 1-2 | 450 |
| Embodiment 1-3 | 494 |
| Embodiment 1-4 | 402 |
| Embodiment 1-5 | 392 |
| Comparative Example 1 | 239 |

The zirconia sintered bodies according to Embodiments 1-1 to 1-5 each have a biaxial bending strength that 390 MPa or more and further exceeds 400 MPa, whereas the zirconia joined body of Comparative Example 1 has a biaxial bending strength of less than 250 MPa. In addition, when the fracture origin of the zirconia joined body according to Comparative Example 1 was checked, the zirconia joined body was confirmed to have broken at a portion where the black zirconia sintered body and the transparent zirconia sintered body were joined.

Embodiment 2-1

Transparent Raw Material

A 10 mol % yttria-containing zirconia powder with a BET specific surface area of 5.3 $m^2/g$ and titania powder with a BET specific surface area of 20 $m^2/g$ are mixed in an ethanol solvent using a ball mill with a ball made of zirconia having a diameter of 10 mm. The ball mill mixing involves pulverizing the titania powder in the ethanol solvent and further mixing the yttria-containing zirconia powder. The mixed powder is dried in air, 10 mol % yttria- and 9.1 mol % titania-containing zirconia powder is obtained, and this is used as the transparent raw material. The titanium (Ti) in the titania contained in the transparent raw material is equivalent to 6.8 mass % as a mass ratio of titanium, calculated in terms of $TiO_2$, relative to the mass of the transparent raw material.

Opaque Raw Material

Alumina powder, nickel oxide powder, cobalt aluminate powder, and 3 mol % yttria-containing zirconia powder are wet-mixed in an ethanol solvent by a ball mill that uses a ball made of zirconia, and a mixed powder is obtained that contains 0.25 mass % alumina, 9.1 mass % nickel oxide, and 0.2 mass % cobalt aluminate, and a remainder is 3 mol % yttria-containing zirconia. This mixed powder is dried in air at 110° C., after which it is sieved, and this is used as the opaque raw material (yellow-green color raw material).

Green Body

The transparent raw material is filled in a disc-shaped primary die mold having a diameter of 25 mm and an convexoconcave surface shape, and is uniaxially pressure-molded at 25 MPa of pressure, whereby a primary green body is obtained that is configured by a disc-shaped transparent green body 2 mm thick and 25 mm in diameter. The primary green body is arranged on a disc-shaped secondary die mold having a diameter of 50 mm such that a convex form on the primary green body serves as a top surface. The opaque raw material is filled so as to cover the entire top surface of the primary green body. Then, by performing uniaxial pressure molding at 50 MPa of pressure, a secondary green body is obtained in which the transparent green body and the opaque green body are laminated, after which the secondary green body undergoes CIP treatment at 200 MPa of pressure. A disc-shaped secondary green body that is 3.5 mm thick and 50 mm in diameter is thus obtained.

Zirconia Sintered Body

The resulting secondary green body undergoes atmospheric pressure sintering in air at a heating rate of 100° C./h, a sintering temperature of 1350° C., and a sintering time of two hours, after which the secondary green body undergoes HIP treatment at a temperature of 1500° C., a pressure of 150 MPa, and a sustained time of one hour. After the HIP treatment, the secondary green body is annealed in air for eight hours at 900° C. to obtain a sintered body. In the HIP treatment, 99.9% pure argon gas is used as the pressure medium and the sample is arranged in a lidded vessel made of carbon.

The sintered body after annealing is cut and polished until the transparent zirconia portion and the opaque zirconia portion are exposed on both surfaces of the sintered body. Accordingly, a 1.0 mm thick, disc-shaped zirconia sintered body is created that is provided with a transparent zirconia portion and an opaque zirconia portion in which the transparent zirconia portion and the opaque zirconia portion are exposed on the same surface, and this is used as the zirconia sintered body according to the present embodiment.

The zirconia sintered body according to the present embodiment has a structure provided with a transparent zirconia portion that is continuous in a thickness direction. Due to the transparency of the transparent zirconia portion, when the zirconia sintered body according to the present embodiment is arranged, it can function as a window member and allow a background design or the like to be visible.

Embodiment 2-2

Transparent Raw Material

The transparent raw material is obtained with a similar method as in Embodiment 2-1.

Opaque Raw Material

Praseodymium oxide powder and 3 mol % yttria-containing zirconia powder are wet-mixed in an ethanol solvent by a ball mill that uses a ball made of zirconia, and a mixed powder is obtained that contains 1.0 mass % praseodymium oxide, and a remainder is 3 mol % yttria-containing zirconia. This mixed powder is dried in air at 110° C., after which it is sieved, and this is used as the opaque raw material (yellow color raw material).

Green Body

Other than using the yellow color raw material as the opaque raw material, a disc-shaped secondary green body that is 3.5 mm thick and 50 mm in diameter is obtained with a similar method as in Embodiment 2-1.

Zirconia Sintered Body

The resulting secondary green body undergoes atmospheric pressure sintering, HIP treatment, and annealing with a similar method as in Embodiment 2-1 to yield a sintered body. The sintered body after annealing is cut and polished similarly to Embodiment 2-1 to yield a disc-shaped zirconia sintered body, which is used as the zirconia sintered body according to the present embodiment.

Embodiment 2-3

Transparent Raw Material

The transparent raw material is obtained with a similar method as in Embodiment 2-1.

Opaque Raw Material

Alumina powder, iron oxyhydroxide powder, and 3 mol % yttria-containing zirconia powder are wet-mixed in an ethanol solvent by a ball mill that uses a ball made of zirconia, and a mixed powder is obtained that contains 0.05 mass % alumina and 0.15 mass % iron oxyhydroxide, and a remainder is 3 mol % yttria-containing zirconia. This mixed powder is dried in air at 110° C., after which it is sieved, and this is used as the opaque raw material (purple color raw material).

Green Body

Other than using the purple color raw material as the opaque raw material, a disc-shaped secondary green body that is 3.5 mm thick and 50 mm in diameter is obtained with a similar method as in Embodiment 2-1.

Zirconia Sintered Body

The resulting secondary green body undergoes atmospheric pressure sintering, HIP treatment, and annealing with a similar method as in Embodiment 2-1 to yield a sintered body. The sintered body after annealing is cut and polished similarly to Embodiment 2-1 to yield a disc-shaped zirconia sintered body, which is used as the zirconia sintered body according to the present embodiment.

Embodiment 2-4

Transparent Raw Material

The transparent raw material is obtained with a similar method as in Embodiment 2-1.

Opaque Raw Material

Alumina powder, cobalt oxide powder, iron oxyhydroxide powder, and 3.2 mol % erbia-containing zirconia powder are wet-mixed in an ethanol solvent by a ball mill that uses a ball made of zirconia, and a mixed powder is obtained that contains 10 mass % alumina, 0.016 mass % cobalt, and 0.19 mass % iron oxyhydroxide, and a remainder is 3.2 mol % erbia-containing zirconia. This mixed powder is dried in air at 110° C., after which it is sieved, and this is used as the opaque raw material (orange color raw material).

Green Body

Other than using the orange color raw material as the opaque raw material, a disc-shaped secondary green body that is 3.5 mm thick and 50 mm in diameter is obtained with a similar method as in Embodiment 2-1.

Zirconia Sintered Body

The resulting secondary green body undergoes atmospheric pressure sintering, HIP treatment, and annealing with a similar method as in Embodiment 2-1 to yield a sintered body. The sintered body after annealing is cut and polished similarly to Embodiment 2-1 to yield a disc-shaped zirconia sintered body, which is used as the zirconia sintered body according to the present embodiment.

Embodiment 2-5

A mixed powder that contains 4.0 mass % praseodymium oxide where the remainder is 3 mol % yttria-containing zirconia is obtained by wet-mixing praseodymium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 2-1.

Embodiment 2-6

A mixed powder that contains 2.0 mass % praseodymium oxide where the remainder is 3 mol % yttria-containing zirconia is obtained by wet-mixing praseodymium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 2-1.

Embodiment 2-7

Transparent Raw Material
Using a similar method as in Embodiment 2-1, 10 mol % yttria- and 9.1 mol % titania-containing zirconia powder is obtained. The titanium (Ti) in the titania contained in the mixed powder is equivalent to 6.8 mass % as a mass ratio of titanium, calculated in terms of $TiO_2$, relative to the mass of the mixed powder. An organic binder containing an acrylic resin is mixed with this powder to yield a composition, which is used as the transparent raw material of the present embodiment.

Opaque Raw Material
With a method similar to Embodiment 2-1, alumina powder, nickel oxide powder, cobalt aluminate powder, and 3 mol % yttria-containing zirconia powder are wet-mixed in an ethanol solvent by a ball mill that uses a ball made of zirconia, and a mixed powder is obtained that contains 0.25 mass % alumina, 9.1 mass % nickel oxide, and 0.2 mass % cobalt aluminate, and a remainder is 3 mol % yttria-containing zirconia. An organic binder containing an acrylic resin is mixed with the mixed powder to yield a composition, which is used as the opaque raw material of the present embodiment.

Green Body
The transparent raw material is injection molded in a primary die mold, and a primary green body is obtained that is configured by a disc-shaped transparent green body 2 mm thick and 25 mm in diameter with an convexoconcave surface shape. The resulting primary green body is arranged on a disc-shaped secondary die mold having a diameter of 50 mm such that the convexsurface shape on the primary green body serves as a top surface. The opaque raw material is injection molded on top of the primary green body so as to cover the entire top surface (exposed surface) of the primary green body, yielding a secondary green body having a disc shape 3.5 mm thick and 50 mm in diameter in which the transparent green body and the opaque green body are laminated.

Zirconia Sintered Body
Other than using the resulting secondary green body, a zirconia sintered body according to the present embodiment is obtained by atmospheric pressure sintering, HIP treatment, annealing, and processing with a similar method as in Embodiment 2-1.

The zirconia sintered body according to the present embodiment has a disc shape 1 mm thick and has the transparent zirconia portion and the opaque zirconia portion exposed on the same surface.

Results of the biaxial bending strength measurement for Embodiments 2-1 to 2-6 are given in the following table, together with the results for Comparative Example 1.

TABLE 2

| | Biaxial bending strength (MPa) |
|---|---|
| Embodiment 2-1 | 525 |
| Embodiment 2-2 | 405 |
| Embodiment 2-3 | 443 |
| Embodiment 2-4 | 405 |
| Embodiment 2-5 | 354 |
| Embodiment 2-6 | 412 |
| Comparative Example 1 | 239 |

The zirconia sintered bodies according to Embodiments 2-1 to 2-6 each have a biaxial bending strength that exceeds 400 MPa.

Embodiment 3-1

Transparent Raw Material
A 10 mol % yttria-containing zirconia powder with a BET specific surface area of 5.3 $m^2/g$ and titania powder with a BET specific surface area of 20 $m^2/g$ are mixed in an ethanol solvent using a ball mill with a ball made of zirconia having a diameter of 10 mm. The ball mill mixing involves pulverizing the titania powder in the ethanol solvent and further mixing the yttria-containing zirconia powder. The mixed powder is dried in air, 10 mol % yttria- and 9.1 mol % titania-containing zirconia powder is obtained, and this is used as the transparent raw material. The titanium (Ti) in the titania contained in the transparent raw material is equivalent to 6.8 mass % as a mass ratio of titanium, calculated in terms of $TiO_2$, relative to the mass of the transparent raw material.

Opaque Raw Material
Alumina powder, cobalt aluminate powder, nickel oxide powder, and 3 mol % yttria-containing zirconia powder are wet-mixed in an ethanol solvent by a ball mill that uses a ball made of zirconia, and a mixed powder is obtained that contains 20 mass % alumina, 0.17 mass % cobalt aluminate, and 0.03 mass % nickel oxide, and a remainder is 3 mol % yttria-containing zirconia. This mixed powder is dried in air at 110° C., after which it is sieved, and this is used as the opaque raw material (pale blue-green color raw material).

Green Body
The transparent raw material is filled in a disc-shaped primary die mold having a diameter of 25 mm and an convexoconcave surface shape, and is uniaxially pressure-molded at 25 MPa of pressure, whereby a primary green body is obtained that is configured by a disc-shaped transparent green body 2 mm thick and 25 mm in diameter. The primary green body is arranged on a disc-shaped secondary die mold having a diameter of 50 mm such that a convex form on the primary green body serves as a top surface. The opaque raw material is filled so as to cover the entire top surface of the primary green body. Then, by performing uniaxial pressure molding at 50 MPa of pressure, a secondary green body is obtained in which the transparent green body and the opaque green body are laminated, after which the secondary green body undergoes CIP treatment at 200 MPa of pressure. A disc-shaped secondary green body that is 3.5 mm thick and 50 mm in diameter is thus obtained.

Zirconia Sintered Body

The resulting secondary green body undergoes atmospheric pressure sintering in air at a heating rate of 100° C./h, a sintering temperature of 1350° C., and a sintering time of two hours, after which the secondary green body undergoes HIP treatment at a temperature of 1500° C., a pressure of 150 MPa, and a sustained time of one hour. After the HIP treatment, the secondary green body is annealed in air for eight hours at 900° C. to obtain a sintered body. In the HIP treatment, 99.9% pure argon gas is used as the pressure medium and the sample is arranged in a lidded vessel made of carbon.

The sintered body after annealing is cut and polished until the transparent zirconia portion and the opaque zirconia portion are exposed on both surfaces of the sintered body. Accordingly, a 1.0 mm thick, disc-shaped zirconia sintered body is created that is provided with a transparent zirconia portion and an opaque zirconia portion in which the transparent zirconia portion and the opaque zirconia portion are exposed on the same surface, and this is used as the zirconia sintered body according to the present embodiment.

The zirconia sintered body according to the present embodiment has a structure provided with a transparent zirconia portion that is continuous in a thickness direction. Due to the transparency of the transparent zirconia portion, when the zirconia sintered body according to the present embodiment is arranged, it can function as a window member and allow a background design or the like to be visible.

Embodiment 3-2

Transparent Raw Material
The transparent raw material is obtained with a similar method as in Embodiment 3-1.
Opaque Raw Material
Alumina powder, cobalt aluminate powder, nickel oxide powder, and 3 mol % yttria-containing zirconia powder are wet-mixed in an ethanol solvent by a ball mill that uses a ball made of zirconia, and a mixed powder is obtained that contains 20 mass % alumina, 0.5 mass % cobalt aluminate, and 0.1 mass % nickel oxide, and a remainder is 3 mol % yttria-containing zirconia. This mixed powder is dried in air at 110° C., after which it is sieved, and this is used as the opaque raw material (pale blue color raw material).
Green Body
Other than using the pale blue color raw material as the opaque raw material, a disc-shaped secondary green body that is 3.5 mm thick and 50 mm in diameter is obtained with a similar method as in Embodiment 3-1.
Zirconia Sintered Body
The resulting secondary green body undergoes atmospheric pressure sintering, HIP treatment, and annealing with a similar method as in Embodiment 3-1 to yield a sintered body. The sintered body after annealing is cut and polished similarly to Embodiment 3-1 to yield a disc-shaped zirconia sintered body, which is used as the zirconia sintered body according to the present embodiment.

Embodiment 3-3

Transparent Raw Material
The transparent raw material is obtained with a similar method as in Embodiment 3-1.
Opaque Raw Material
Neodymium oxide powder and 3 mol % yttria-containing zirconia powder are wet-mixed in an ethanol solvent by a ball mill that uses a ball made of zirconia, and a mixed powder is obtained that contains 2 mass % neodymium oxide, and a remainder is 3 mol % yttria-containing zirconia. This mixed powder is dried in air at 110° C., after which it is sieved, and this is used as the opaque raw material (pale purple color raw material).
Green Body
Other than using the pale purple color raw material as the opaque raw material, a disc-shaped secondary green body that is 3.5 mm thick and 50 mm in diameter is obtained with a similar method as in Embodiment 3-1.
Zirconia Sintered Body
The resulting secondary green body undergoes atmospheric pressure sintering, HIP treatment, and annealing with a similar method as in Embodiment 3-1 to yield a sintered body. The sintered body after annealing is cut and polished similarly to Embodiment 3-1 to yield a disc-shaped zirconia sintered body, which is used as the zirconia sintered body according to the present embodiment.

Embodiment 3-4

Transparent Raw Material
The transparent raw material is obtained with a similar method as in Embodiment 3-1.
Opaque Raw Material
Alumina powder and 3.2 mol % erbia-containing zirconia powder are wet-mixed in an ethanol solvent by a ball mill that uses a ball made of zirconia, and a mixed powder is obtained that contains 0.05 mass % alumina, and a remainder is 3.2 mol % erbia-containing zirconia. This mixed powder is dried in air at 110° C., after which it is sieved, and this is used as the opaque raw material (pale red color raw material).
Green Body
Other than using the pale red color raw material as the opaque raw material, a disc-shaped secondary green body that is 3.5 mm thick and 50 mm in diameter is obtained with a similar method as in Embodiment 3-1.
Zirconia Sintered Body
The resulting secondary green body undergoes atmospheric pressure sintering, HIP treatment, and annealing with a similar method as in Embodiment 3-1 to yield a sintered body. The sintered body after annealing is cut and polished similarly to Embodiment 3-1 to yield a disc-shaped zirconia sintered body, which is used as the zirconia sintered body according to the present embodiment.

Embodiment 3-5

A mixed powder that contains 3.0 mass % neodymium oxide where the remainder is 3 mol % yttria-containing zirconia is obtained by wet-mixing neodymium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 3-1.

Embodiment 3-6

A mixed powder that contains 4.0 mass % erbium oxide where the remainder is 3 mol % yttria-containing zirconia is obtained by wet-mixing erbium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 3-1.

Embodiment 3-7

A mixed powder that contains 2.0 mass % erbium oxide where the remainder is 3 mol % yttria-containing zirconia is obtained by wet-mixing erbium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 3-1.

Embodiment 3-8

A mixed powder that contains 3.0 mass % europium oxide where the remainder is 3 mol % yttria-containing zirconia is obtained by wet-mixing europium oxide powder and 3 mol % yttria-containing zirconia powder in an ethanol solvent with a ball mill that uses a ball made of zirconia, and other than using this mixed powder as the opaque raw material, the zirconia sintered body according to the present embodiment is obtained with a similar method as in Embodiment 3-1.

Embodiment 3-9

Transparent Raw Material
Using a similar method as in Embodiment 3-1, 10 mol % yttria- and 9.1 mol % titania-containing zirconia powder is obtained. The titanium (Ti) in the titania contained in the mixed powder is equivalent to 6.8 mass % as a mass ratio of titanium, calculated in terms of $TiO_2$, relative to the mass of the mixed powder. An organic binder containing an acrylic resin is mixed with this powder to yield a composition, which is used as the transparent raw material of the present embodiment.

Opaque Raw Material
With a method similar to Embodiment 3-1, alumina powder, cobalt aluminate powder, nickel oxide powder, and 3 mol % yttria-containing zirconia powder are wet-mixed in an ethanol solvent by a ball mill that uses a ball made of zirconia, and a mixed powder is obtained that contains 20 mass % alumina, 0.17 mass % cobalt aluminate, and 0.03 mass % nickel oxide, and a remainder is 3 mol % yttria-containing zirconia. An organic binder containing an acrylic resin is mixed with the mixed powder to yield a composition, which is used as the opaque raw material of the present embodiment.

Green Body
The transparent raw material is injection molded in a primary die mold, and a primary green body is obtained that is configured by a disc-shaped transparent green body 2 mm thick and 25 mm in diameter with an uneven surface shape. The resulting primary green body is arranged on a disc-shaped secondary die mold having a diameter of 50 mm such that the uneven surface shape on the primary green body serves as a top surface. The opaque raw material is injection molded on top of the primary green body so as to cover the entire top surface (exposed surface) of the primary green body, yielding a secondary green body having a disc shape 3.5 mm thick and 50 mm in diameter in which the transparent green body and the opaque green body are laminated.

Zirconia Sintered Body
Other than using the resulting secondary green body, a zirconia sintered body according to the present embodiment is obtained by atmospheric pressure sintering, HIP treatment, annealing, and processing with a similar method as in Embodiment 3-1.

The zirconia sintered body according to the present embodiment has a disc shape 1 mm thick and has the transparent zirconia portion and the opaque zirconia portion exposed on the same surface.

Results of the biaxial bending strength measurement for Embodiments 3-1 to 3-8 are given in the following table, together with the results for Comparative Example 1.

TABLE 3

|  | Biaxial bending strength (MPa) |
| --- | --- |
| Embodiment 3-1 | 483 |
| Embodiment 3-2 | 382 |
| Embodiment 3-3 | 371 |
| Embodiment 3-4 | 375 |
| Embodiment 3-5 | 480 |
| Embodiment 3-6 | 608 |
| Embodiment 3-7 | 631 |
| Embodiment 3-8 | 386 |
| Comparative Example 1 | 239 |

The zirconia sintered bodies according to Embodiments 3-1 to 3-8 each have a biaxial bending strength that exceeds 350 MPa.

Compound Example 1-1 (Transparent Zirconia Sintered Body)

A primary green body is obtained with a similar method as in Embodiment 1-1. A transparent zirconia sintered body is created with a method similar to that of Embodiment 1-1, except that the resulting primary green body is used instead of the secondary green body.

The zirconia sintered body obtained exhibits similar transparency to the transparent zirconia portion of the zirconia sintered body according to Embodiment 1-1, has a in-line transmittance of 69%, and an average crystal grain size of 25 μm.

Compound Example 1-2 (Black Zirconia Sintered Body)

A primary green body is obtained with a similar method as in Embodiment 1-1, except that the raw material powder for the opaque zirconia portion obtained in Embodiment 1-1 is used instead of the transparent zirconia portion raw material powder. A black zirconia sintered body is created with a method similar to that of Embodiment 1-1, except that the resulting primary green body is used instead of the secondary green body.

The resulting zirconia sintered body exhibits a similar color tone to the opaque zirconia portion of the zirconia sintered body according to Embodiment 1-1 and has a in-line transmittance of 0% (at or below the detection limit). Also, in the L*a*b* color system, L* is 19.16, a* is 1.34, and b* is 0.51.

Compound Example 1-3 (Dark Orange Zirconia Sintered Body)

A primary green body is obtained with a similar method as in Embodiment 1-1, except that the raw material powder for the opaque zirconia portion obtained in Embodiment 1-2 is used instead of the transparent zirconia portion raw material powder. A dark orange zirconia sintered body is created with a method similar to that of Embodiment 1-1, except that the resulting primary green body is used instead of the secondary green body.

The resulting zirconia sintered body exhibits a similar color tone to the opaque zirconia portion of the zirconia sintered body according to Embodiment 1-2 and has a in-line transmittance of 0% (at or below the detection limit). Also, in the L*a*b* color system, L* is 21.83, a* is 11.51, and b* is 13.42.

Compound Example 1-4 (Dark Yellow Zirconia Sintered Body)

A primary green body is obtained with a similar method as in Embodiment 1-1, except that the raw material powder for the opaque zirconia portion obtained in Embodiment 1-3 is used instead of the transparent zirconia portion raw material powder. A dark yellow zirconia sintered body is created with a method similar to that of Embodiment 1-1, except that the resulting primary green body is used instead of the secondary green body.

The resulting zirconia sintered body exhibits a similar color tone to the opaque zirconia portion of the zirconia sintered body according to Embodiment 1-3 and has a in-line transmittance of 0% (at or below the detection limit). Also, in the L*a*b* color system, L* is 26.55, a* is 19.46, and b* is 27.71.

Compound Example 1-5 (Dark Blue Zirconia Sintered Body)

A primary green body is obtained with a similar method as in Embodiment 1-1, except that the raw material powder for the opaque zirconia portion obtained in Embodiment 1-4 is used instead of the transparent zirconia portion raw material powder. A dark blue zirconia sintered body is created with a method similar to that of Embodiment 1-1, except that the resulting primary green body is used instead of the secondary green body.

The resulting zirconia sintered body exhibits a similar color tone to the opaque zirconia portion of the zirconia sintered body according to Embodiment 1-4 and has a in-line transmittance of 0% (at or below the detection limit). Also, in the L*a*b* color system, L* is 19.23, a* is −7.24, and b* is −28.25.

Compound Example 1-6 (Dark Blue Zirconia Sintered Body)

A primary green body is obtained with a similar method as in Embodiment 1-1, except that the raw material powder for the opaque zirconia portion obtained in Embodiment 1-5 is used instead of the transparent zirconia portion raw material powder. A dark blue zirconia sintered body is created with a method similar to that of Embodiment 1-1, except that the resulting primary green body is used instead of the secondary green body.

The resulting zirconia sintered body exhibits a similar color tone to the opaque zirconia portion of the zirconia sintered body according to Embodiment 1-5 and has a in-line transmittance of 0% (at or below the detection limit). Also, in the L*a*b* color system, L* is 13.51, a* is 0.18, and b* is 1.20.

Compound Example 2-1 (Yellow-Green Zirconia Sintered Body)

A primary green body is obtained with a similar method as in Embodiment 2-1, except that the raw material powder for the opaque zirconia portion obtained in Embodiment 2-1 is used instead of the transparent zirconia portion raw material powder. A yellow-green zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-1 and has a in-line transmittance of 0% (at or below the detection limit). Also, in the L*a*b* color system, L* is 45.85, a* is −14.14, and b* is 13.94.

Compound Example 2-2 (Yellow Zirconia Sintered Body)

A primary green body is obtained with a similar method as in Embodiment 2-1, except that the raw material powder for the opaque zirconia portion obtained in Embodiment 2-2 is used instead of the transparent zirconia portion raw material powder. A yellow zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-2 and has a in-line transmittance of 0% (at or below the detection limit). Also, in the L*a*b* color system, L* is 55.69, a* is 28.22, and b* is 66.94.

Compound Example 2-3 (Purple Zirconia Sintered Body)

A primary green body is obtained with a similar method as in Embodiment 2-1, except that the raw material powder for the opaque zirconia portion obtained in Embodiment 2-3 is used instead of the transparent zirconia portion raw material powder. A purple zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-3 and has a in-line transmittance of 0% (at or below the detection limit). Also, in the L*a*b* color system, L* is 58.87, a* is 13.83, and b* is −19.63.

Compound Example 2-4 (Orange Zirconia Sintered Body)

A primary green body is obtained with a similar method as in Embodiment 2-1, except that the raw material powder for the opaque zirconia portion obtained in Embodiment 2-4 is used instead of the transparent zirconia portion raw material powder. An orange zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-4 and has a in-line transmittance of 0% (at or below the detection limit). Also, in the L*a*b* color system, L* is 44.47, a* is 14.37, and b* is 19.22.

Compound Example 2-5 (Orange Zirconia Sintered Body)

A primary green body is obtained with a similar method as in Embodiment 2-1, except that the raw material powder for the opaque zirconia portion obtained in Embodiment 2-5 is used instead of the transparent zirconia portion raw material powder. An orange zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-5 and has a in-line transmittance of 0% (at or below the detection limit). Also, in the L*a*b* color system, L* is 47.11, a* is 36.37, and b* is 73.63.

Compound Example 2-6 (Orange Zirconia Sintered Body)

A primary green body is obtained with a similar method as in Embodiment 2-1, except that the raw material powder for the opaque zirconia portion obtained in Embodiment 2-6 is used instead of the transparent zirconia portion raw material powder. An orange zirconia sintered body is created with a method similar to that of Embodiment 2-1, except that the resulting primary green body is used instead of the secondary green body.

The resulting zirconia sintered body exhibits a similar color tone to the opaque zirconia portion of the zirconia sintered body according to Embodiment 2-6 and has a in-line transmittance of 0% (at or below the detection limit). Also, in the L*a*b* color system, L* is 53.58, a* is 34.90, and b* is 78.47.

Compound Example 3-1 (Pale Blue-Green Zirconia Sintered Body)

A primary green body is obtained with a similar method as in Embodiment 3-1, except that the raw material powder for the opaque zirconia portion obtained in Embodiment 3-1 is used instead of the transparent zirconia portion raw material powder. A pale blue-green zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-1 and has a in-line transmittance of 0% (at or below the detection limit). Also, in the L*a*b* color system, L* is 71.25, a* is −6.43, and b* is −3.6.

Compound Example 3-2 (Pale Blue Zirconia Sintered Body)

A primary green body is obtained with a similar method as in Embodiment 3-1, except that the raw material powder for the opaque zirconia portion obtained in Embodiment 3-2 is used instead of the transparent zirconia portion raw material powder. A pale blue zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-2 and has a in-line transmittance of 0% (at or below the detection limit). Also, in the L*a*b* color system, L* is 66.14, a* is −9.84, and b* is −9.15.

Compound Example 3-3 (Pale Purple Zirconia Sintered Body)

A primary green body is obtained with a similar method as in Embodiment 3-1, except that the raw material powder for the opaque zirconia portion obtained in Embodiment 3-3 is used instead of the transparent zirconia portion raw material powder. A pale purple zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-3 and has a in-line transmittance of 0% (at or below the detection limit). Also, in the L*a*b* color system, L* is 60.31, a* is 14.17, and b* is −20.21.

Compound Example 3-4 (Pale Red Zirconia Sintered Body)

A primary green body is obtained with a similar method as in Embodiment 3-1, except that the raw material powder for the opaque zirconia portion obtained in Embodiment 3-4 is used instead of the transparent zirconia portion raw material powder. A pale red zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-4 and has a in-line transmittance of 0% (at or below the detection limit). Also, in the L*a*b* color system, L* is 72.16, a* is 31.22, and b* is −5.84.

Compound Example 3-5 (Pale Purple Zirconia Sintered Body)

A primary green body is obtained with a similar method as in Embodiment 3-1, except that the raw material powder for the opaque zirconia portion obtained in Embodiment 3-5 is used instead of the transparent zirconia portion raw material powder. A pale purple zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-5 and has a in-line transmittance of 0% (at or below the detection limit). Also, in the L*a*b* color system, L* is 60.31, a* is 16.00, and b* is −19.31.

Compound Example 3-6 (Pale Pink Zirconia Sintered Body)

A primary green body is obtained with a similar method as in Embodiment 3-1, except that the raw material powder for the opaque zirconia portion obtained in Embodiment 3-6 is used instead of the transparent zirconia portion raw material powder. A pale pink zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-6 and has a in-line transmittance of 0% (at or below the detection limit). Also, in the L*a*b* color system, L* is 75.57, a* is 22.87, and b* is −2.89.

Compound Example 3-7 (Pale Pink Zirconia Sintered Body)

A primary green body is obtained with a similar method as in Embodiment 3-1, except that the raw material powder for the opaque zirconia portion obtained in Embodiment 3-7 is used instead of the transparent zirconia portion raw material powder. A pale pink zirconia sintered body is created with a method similar to that of Embodiment 3-1, except that the resulting primary green body is used instead of the secondary green body.

The resulting zirconia sintered body exhibits a similar color tone to the opaque zirconia portion of the zirconia sintered body according to Embodiment 3-7 and has a in-line transmittance of 0% (at or below the detection limit). Also, in the L*a*b* color system, L* is 79.90, a* is 16.19, and b* is 0.11.

The disclosures of the specification of the present invention incorporate, in their entirety, the specifications, scope of the claims, drawings, and abstracts of Japanese Patent Application Nos. 2019-161077, 2019-161082, and 2019-161090 filed on Sep. 4, 2019.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A zirconia sintered body comprising:
a transparent zirconia portion and an opaque zirconia portion, wherein
the zirconia sintered body has a structure where the transparent zirconia portion and the opaque zirconia portion are sintered,
a biaxial bending strength is 300 MPa or more,
the opaque zirconia portion comprises an opaque zirconia sintered body, and a color tone in the L*a*b* color system for the opaque zirconia sintered body is:
L*: 0 or more and 100 or less,
a*: −100 or more and 100 or less,
b*: −100 or more and 100 or less, and
the color tone does not include color tones where, when L* is 10 or more, a* is in a range of from −2 to 2, and b* is in a range of from −2 to 5.

2. The zirconia sintered body according to claim 1, wherein the transparent zirconia portion and the opaque zirconia portion occupy the same plane.

3. The zirconia sintered body according to claim 1, wherein a in-line transmittance of the transparent zirconia portion is 50% or more.

4. The zirconia sintered body according to claim 1, wherein the in-line transmittance of the opaque zirconia portion is less than 5%.

5. The zirconia sintered body according to claim 1, wherein L* in the L*a*b* color system for the opaque zirconia sintered body is 0 or more and 30 or less.

6. The zirconia sintered body according to claim 1, wherein L* in the L*a*b* color system for the opaque zirconia sintered body is more than 30 and 60 or less.

7. The zirconia sintered body according to claim 1, wherein L* in the L*a*b* color system for the opaque zirconia sintered body is more than 60.

8. The zirconia sintered body according to claim 1, wherein the transparent zirconia portion contains zirconia that contains a stabilizer and titania.

9. The zirconia sintered body according to claim 8, wherein the stabilizer is at least one selected from a group of yttria, calcia, and magnesia.

10. The zirconia sintered body according to claim 8, wherein the stabilizer in the transparent zirconia portion is yttria, and yttria content is 6 mol % or more and 12 mol % or less.

11. The zirconia sintered body according to claim 8, wherein the stabilizer in the opaque zirconia portion is yttria, and yttria content is 2 mol % or more and less than 6 mol %.

12. The zirconia sintered body according to claim 1, wherein the opaque zirconia portion contains a coloring element.

13. The zirconia sintered body according to claim 12, wherein the coloring element is at least one selected from a group of transition metal elements, alkali metal elements, alkaline earth metal elements, aluminum, silicon, boron, phosphorus, germanium, and rare earth elements.

14. The zirconia sintered body according to claim 1, wherein the biaxial bending strength is 350 MPa or more.

15. A manufacturing method of the zirconia sintered body according to claim 1 comprising:
a sintering process, comprising A) laminating a primary green body comprising one of a first raw material powder for the transparent zirconia portion or a second raw material powder for the opaque zirconia portion, and a green body comprising the other of the first or second raw material powder to create a secondary green body comprising at least one region formed from said first raw material powder and at least one region formed from said second raw material powder, and B) sintering the secondary green body.

16. The manufacturing method of the zirconia sintered body according to claim 15, wherein the raw material powder for the transparent zirconia portion is a mixed powder containing a stabilizer-containing zirconia source and a titania source.

17. The manufacturing method of the zirconia sintered body according to claim 15, wherein the sintering includes at least HIP treatment.

18. The manufacturing method according to claim 15, wherein the sintering is performed with atmospheric pressure sintering at 1300° C. or more and 1400° C. or less, after which HIP treatment is performed at 1450° C. or more and 1550° C. or less.

\* \* \* \* \*